United States Patent
Asano

[19]

[11] Patent Number: 5,881,240
[45] Date of Patent: Mar. 9, 1999

[54] METHOD AND DEVICE FOR SETTING SPEED OF DATA TRANSMISSION

[75] Inventor: Yuji Asano, Nagoya, Japan

[73] Assignee: Brother Kogyo Kabushiki Kaisha, Nagoya, Japan

[21] Appl. No.: 621,096

[22] Filed: Mar. 22, 1996

[30]      Foreign Application Priority Data

Mar. 29, 1995  [JP]  Japan ..................................... 7-071828
Mar. 29, 1995  [JP]  Japan ..................................... 7-071829

[51] Int. Cl.$^6$ .............................. G06F 13/38; G06F 15/17
[52] U.S. Cl. ................................ 395/200.63; 395/200.58; 379/93.33
[58] Field of Search ............................... 379/93.33, 93.08; 395/109, 200.63, 200.58, 200.8; 375/222, 223; 370/232

[56]                  References Cited

U.S. PATENT DOCUMENTS

| | | | |
|---|---|---|---|
| 4,153,916 | 5/1979 | Miwa et al. ............................. | 358/257 |
| 4,737,967 | 4/1988 | Cahalan ....................................... | 375/9 |
| 4,748,625 | 5/1988 | Krause et al. ............................. | 371/22 |
| 5,182,762 | 1/1993 | Shirai et al. ............................. | 375/122 |
| 5,276,679 | 1/1994 | McKay et al. ............................. | 370/84 |
| 5,303,067 | 4/1994 | Kang et al. ............................. | 358/442 |
| 5,490,209 | 2/1996 | Kennedy et al. ......................... | 379/97 |

*Primary Examiner*—Mark H. Rinehart
*Attorney, Agent, or Firm*—Oliff & Berridge, PLC

[57]                ABSTRACT

Transmission, speed at which data is transmitted over a digital transmission line between a transmission device and a remote device, is set by transmitting an inquiry command to the remote device at a predetermined transmission speed; receiving, from the remote device, a response to the inquiry command; determining based on the content of the response any transmission speeds common between the remote device and the transmission device; and setting transmission speed at which transmission between the transmission device and a remote device is to be performed to one of the transmission speeds common between the remote device and the transmission device.

25 Claims, 19 Drawing Sheets

METHOD AND DEVICE FOR SETTING SPEED OF DATA TRANSMISSION

BACKGROUND OF THE INVENTION

1. Field of the Invention

The present invention relates to a method and device for setting speed of data transmission.

2. Description of the Related Art

Digital transmission is only possible if a transmitting facsimile machine and a remote facsimile machine are set to the same transmission speed. Conventionally, to insure that two facsimile machines are set to a transmission speed common to both, facsimile machines follow a series of operations internationally standardized by the Consultative Committee in International Telegraphy and Telephony (CCITT). First, a transmitting facsimile machine will dial a remote facsimile machine. Once the telephone circuit is connected, the remote facsimile machine will transmit a digital identification signal (DIS) at 300 bps to the transmitting facsimile machine. The DIS includes information on capabilities of the remote facsimile machine such as transmission speeds at which the remote facsimile machine is capable of receiving facsimile data, the resolution, that is, super fine, fine, or standard, of the remote facsimile machine, and method of digital compression. The transmitting facsimile machine receives the DIS and compares its own capabilities with contents of the DIS. The transmitting facsimile machine then selects capabilities common to both itself and the remote facsimile machine and transmits these conditions to the remote facsimile machine in a digital command signal (DCS) also at 300 bps. In this way, the transmission speed, resolution, and method of data compression for transmission between the two facsimile machines are set.

There has been known a facsimile machine capable of transmission and reception with a computer system. The facsimile machine is provided with an interface, such as an RS232C interface, which allows the facsimile machine to be connected to the computer system. With this configuration, image data from the computer system can be transmitted to the facsimile machine, which can then transmit the image data over a telephone circuit to a remote facsimile machine. Also, the facsimile machine can transmit image data received from a remote facsimile machine to the computer system, which uses the image data for various purposes.

When a facsimile machine is connected to a computer system in this manner, the user normally uses the same facsimile machine and the same computer. Therefore, the user accomplishes transmission between the two by setting the transmission speed of the interface, for example, the RS232C interface, to the same speed as the transmission speed of the interface of the facsimile machine.

SUMMARY OF THE INVENTION

However, each time the facsimile machine is changed, the setting for the transmission speed of the computer system must also be changed. To spare users this troublesome operation, it is therefore desirable that transmission speed between the facsimile machine and the computer system be automatically matched.

In one conceivable method for automatically matching transmission speeds, the computer system could measure the duration of the start bit for a specific command, for example, an AT code command, transmitted from the facsimile machine at the start of transmission. The computer system could then determine the transmission speed at which the facsimile machine transmitted the command and then start transmission at that transmission speed.

However, signals are extremely short and so it is difficult to measure the duration of a specific signal. To accurately measure the duration of a specific signal, the computer system would have to observe the start and end of the specific signal at an extremely short cycle. This would place a very large load on the computer system.

Computer systems normally perform more than one process at a time and are frequency performing a variety of interruption processes and the like. A computer system would be unable to observe the predetermined signal at a short cycle while under a certain amount of load from interruption processes. Therefore, the computer system would be unable to accurately measure the duration of the predetermined signal from its start to finish.

If the computer system mistakes the transmission speed of the facsimile machine, it might start transmission at a speed at which reception by the facsimile machine is impossible. As a result, transmission becomes impossible from the start or during transmission.

It is an objective of the present invention to overcome the above-described problems and allow transmission speed of the facsimile machine to be automatically selected, thereby allowing start of proper transmission.

To achieve the above described objectives, a data transmission speed setting device according to the present invention is for setting speed at which data is transmitted between a transmission device and a remote device over a digital transmission line. The data transmission speed setting device includes inquiry command transmission means for transmitting an inquiry command to the remote device at a predetermined transmission speed; transmission speed capability acquisition means for receiving, from the remote device, a response to the inquiry command and for determining based on the content of the response any transmission speeds common between the remote device and the transmission device; and transmission speed setting means for setting transmission speed at which transmission between the transmission device and a remote device is to be performed to one of the transmission speeds common between the remote device and the transmission device.

According to another aspect of the invention, the data transmission includes inquiry command transmission means for transmitting an inquiry command to the remote device at a predetermined transmission speed; transmission speed capability acquisition means for receiving, from the remote device, a response to the inquiry command; and transmission speed setting means for setting transmission speed at which transmission between the transmission device and a remote device is to be performed to the predetermined transmission speed of the inquiry command transmission means.

According to still another aspect of the present invention, a method for setting speed at which data is transmitted between a transmission device and a remote device over a digital transmission line, involves transmitting an inquiry command to the remote device at a predetermined transmission speed; receiving, from the remote device, a response to the inquiry command; determining based on the content of the response any transmission speeds common between the remote device and the transmission device; and setting transmission speed at which transmission between the transmission device and a remote device is to be performed to one of the transmission speeds common between the remote device and the transmission device.

According to still another aspect of the present invention, a method involves transmitting an inquiry command to the remote device at a predetermined transmission speed; receiving, from the remote device, a response to the inquiry command; and setting transmission speed at which transmission between the transmission device and a remote device is to be performed to the predetermined transmission speed.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
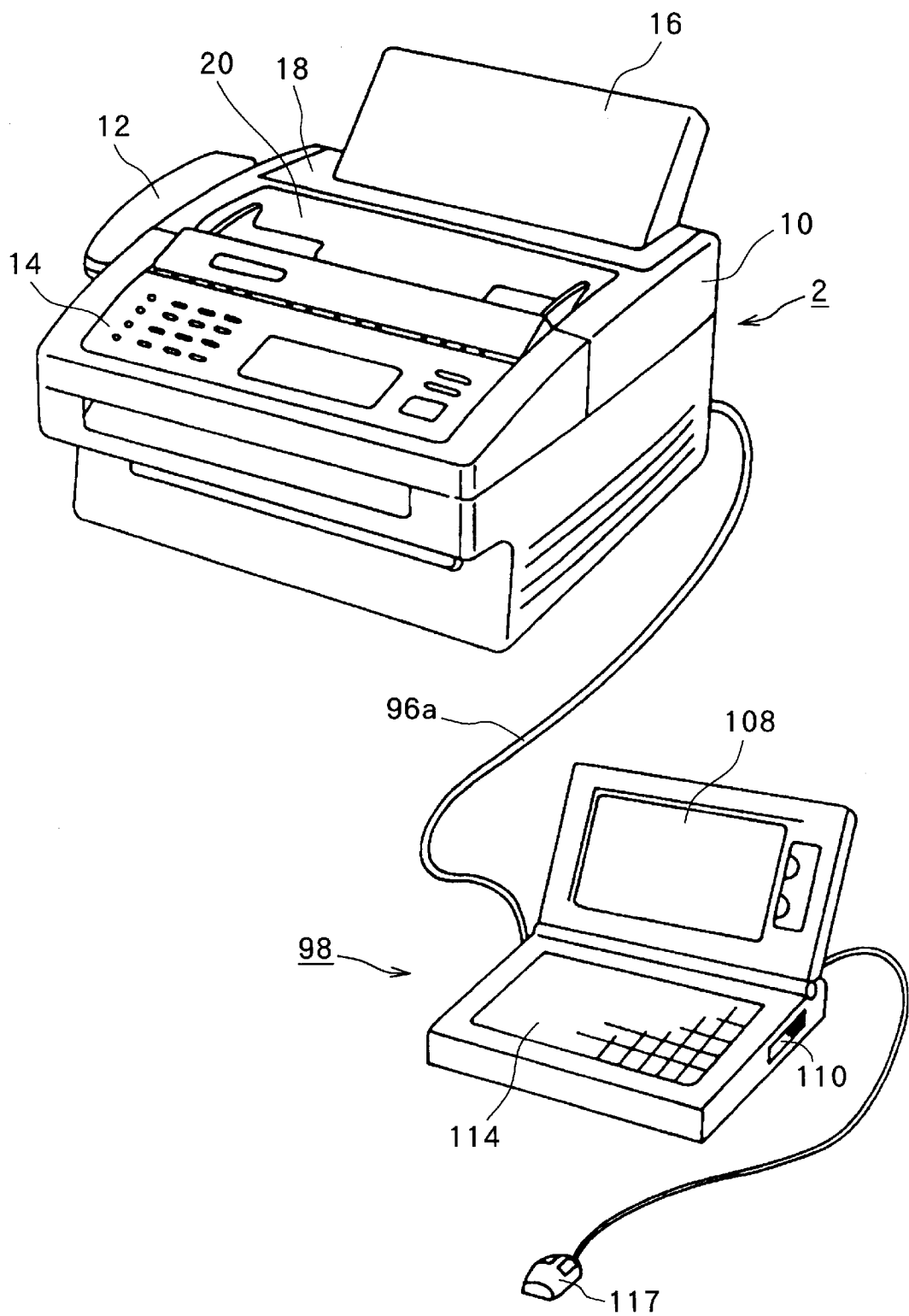
FIG. 1 is a perspective view showing a facsimile machine and a computer according to a first embodiment of the present invention.

A method and device for setting speed of data transmission according to preferred embodiments of the present invention will be described while referring to the accompanying drawings wherein like parts and components are designated by the same reference numerals to avoid duplicating description.

Figure 2:
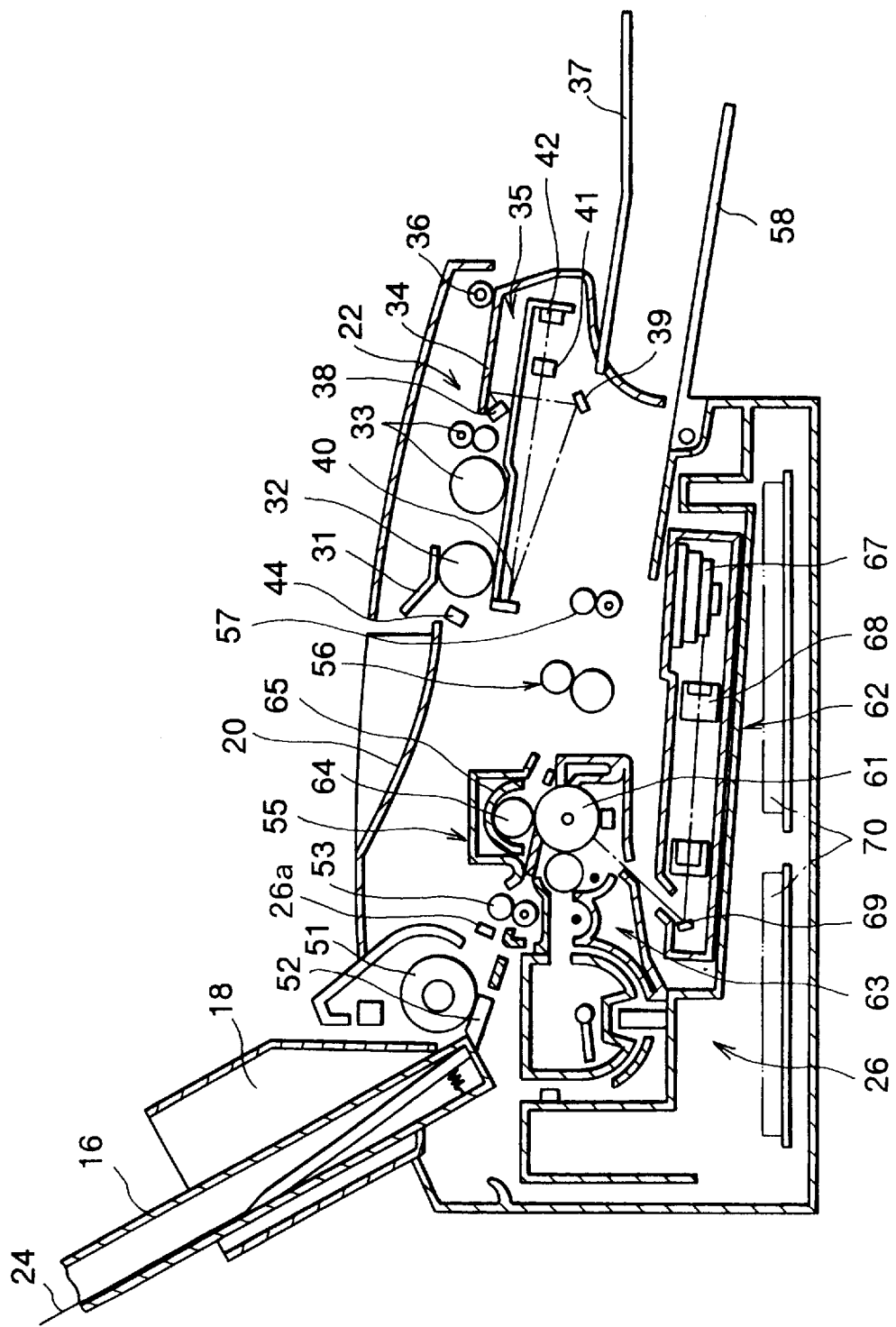
FIG. 2 is a cross-sectional view showing internal configuration of the facsimile machine.
Figure 3:
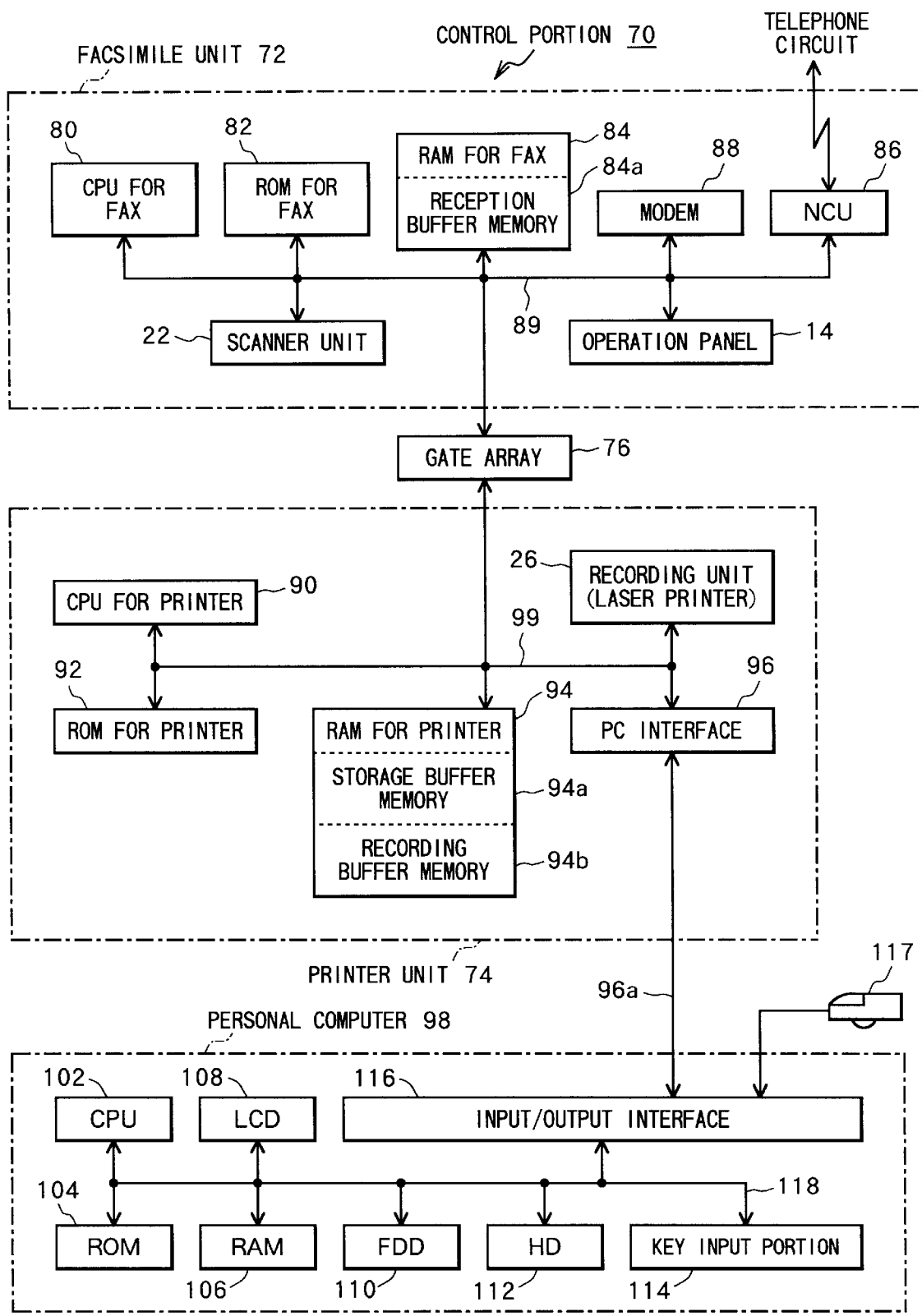
FIG. 3 is a block diagram schematically showing internal configuration and interconnection of the facsimile machine and the computer.

FIG. 1 is a perspective view showing outer appearance of the facsimile machine 2. FIG. 2 is a cross-sectional view showing internal works of the facsimile machine 2. FIG. 3 is a block diagram showing a facsimile machine 2 with a printer function.

The facsimile machine 2 can retrieve an image from a document and transmit the image data over a telephone circuit to a remote facsimile machine as facsimile data. The facsimile machine 2 can also receive facsimile data transmitted from a remote facsimile machine and form images on a recording sheet according to the facsimile data.

In addition to functioning as a facsimile machine, the facsimile machine 2 can also function as a printer. In the present embodiment, the facsimile machine 2 is connected to a personal computer 98 by a cable 96a, although it may be connected to a word processor instead of the computer 98. The personal computer 98 outputs print data, referred to as PC data hereinafter, over the cable 96a to the facsimile machine 2, where the facsimile machine 2 acts as a printer to record on a recording sheet an image according to the data.

As will be described later, when the computer 98 transmits to the facsimile machine a command requesting information on various functions and settings thereof provided to the facsimile machine, the facsimile machine 2 transmits facsimile machine function data, which describes functions of which the facsimile machine is capable, to the computer 98 in response to the command. The facsimile machine 2 then receives function setting data from the computer 98 and adjusts settings for its functions accordingly.

As shown in FIG. 1, the facsimile machine 2 has a main body 10. A handset 12 is provided to the side of the main body 10. An operation panel 14 is provided to the upper front of the main body 10. A cassette mounting portion 18 for freely detachably mounting a recording sheet cassette 16 is formed to the upper rear of the main body 10. A document tray 20 is formed at the center of the main body 10.

As shown in FIG. 2, various components are provided internal to the main body 10, including: a scanner unit 22 for retrieving images from documents placed on the document tray 20; a recording unit 26 for forming images on one of the recording sheets 24 stored in the recording sheet cassette 16; and a control unit 70 for controlling these components and implementing the above-described functions.

A document feed mechanism having a document tray 20 on which documents are placed, a sheet-feed roller 32, and a separating pad 31 is provided adjacent to the scanner unit 22. The sheet-feed roller acts in cooperation with the separating pad 31 to remove one sheet at a time from documents placed on the document tray 20 and to transport them toward the scanner unit 22.

The scanner unit 22 includes a transport roller 33, document support plate 34, an image retrieval unit 35 disposed beneath the document support plate 34; a discharge roller 36; and a discharge tray 37 provided at the front of the main body 10. The transport roller 44 transports documents from the document feed mechanism to the document support plate 34 where the image retrieval unit 35 retrieves the image of the document. After image retrieval is completed, the discharge roller 36 discharges the document onto the discharge tray 37.

The image retrieval unit 35 is a well-known device for retrieving one line at a time of a document's image and includes a light source 38, mirrors 39, 40, a lens 41, a line image sensor 42, and a document sensor 44. The document sensor 44 is for optically detecting whether or not a document is set on the document tray 20 and is provided in the transport path from the document tray 20 of the sheet-feed mechanism. The light source 38 irradiates the document on the document support plate 34. Light reflected from the document reflects off the mirrors 39, 40 toward the lens 41. After passing through the lens 41, the light is condensed on a light-receiving surface of the line image sensor 42.

The recording unit 26 includes a sheet-feed unit, an image forming unit 55, a fixing unit 56, and a sheet-discharge unit. The sheet-feed unit includes a sheet-feed roller 51, a separation pad 52, and transport rollers 53 and is provided adjacent to the recording unit 26. The sheet-feed roller 51 and the separation pad 52 remove one sheet at a time recording sheets 24 stored in the recording sheet cassette 16. The transport roller 53 transports the recording sheets 24 to the recording unit 26.

The image forming unit 55 of the recording unit 26 includes a photosensitive drum 61; a laser scanning device 62 for forming latent static images on the surface of the photosensitive drum 61 using laser light; a developing unit 63 for developing the latent static image on the photosensitive drum 61 using toner; and a transfer unit 65 including a transfer roller 64 for applying an electric charge to the recording sheets 24 and transferring toner clinging to the photosensitive drum 61 to a recording sheets 24. The laser scanning device 62 includes a laser source 67 for emitting laser light according to commands from the control unit 70; a lens 68 for condensing the laser light; and a reflection mirror 69 for guiding laser light condensed by the lens 68 to the photosensitive drum 61.

The fixing unit 56 is a well-known device including a heat roller with an internal heater and a pressure roller sandwiching the recording sheets 24 between itself and the heat roller. By heating and pressing the recording sheets 24, the fixing unit 56 fixes the toner image on the recording sheet 24.

The sheet-discharge unit includes a discharge roller 57 and a discharge tray 58 provided to the front surface of the main body 10.

Recording sheets 24 fed by the transport roller 53 are introduced to the image forming unit 55, where toner images are formed on the recording sheets 24. After a toner image is formed on the recording sheets 24, the recording sheets 24 are transported to a fixing unit 56, where the toner image is fixed to the recording sheets 24. Then the discharge roller, discharges the recording sheets 24 onto the discharge tray 58.

In other words, the recording portion 26 is configured as a so-called laser printer and forms an image on the recording paper 24 according to commands from the control portion 70. It should be noted that when an image is formed, a sheet edge sensor 26a detects the edge of the recording sheets 24. Timing of transfer operations performed by the transfer unit 65 are based on this detection.

As shown in FIG. 3, the control portion 70 which controls the various components described above includes a facsimile (fax) portion 72, a printer unit 74, and a gate array 76 for connecting the fax portion 72 to the printer unit 74.

The fax portion 72 includes a CPU 80, ROM 82, RAM 84, a network control unit (NCU) 86, a modem 88, an operation panel 14, and a scanner unit 22, all connected to each other by a bus 89, which is also connected to the gate array 76. The NCU 86 allows voice communication and transmission and reception of fax data between a remote telephone or facsimile device. The modem 88 allows transmission and reception of fax data between a remote facsimile device via the NCU 86. According to commands From an operator which are input via the operation panel 14, the fax portion 72 carries out various operations such as setting of the operation mode, reading of the sheet image, transmission and reception of fax data, decoding of received data, transfer of decoded fax data to the printer unit 74, and the like. The NCU 86 is connected to the handset 12, a voice-emitting speaker, and other components so that voice communication with a remote telephone can be carried out via the handset 12.

The printer unit 74 is configured in the same way as well-known microcomputers, as is the fax portion 72, having a CPU 90, a ROM 92, and a RAM 94 as main components. Further, a PC interface 96, which serves as a printer data input portion, is provided in the printer portion 74. Examples of the PC interface 96 are centronics interface and RS232C.

The printer portion 74 controls drive of the recording portion 26 according to the fax data sent from the fax portion 72 via the gate array 76 so that a facsimile image can be formed on a recording sheet 24. The CPU 90 of the printer portion 74 controls drive of the recording portion 26 according to PC data inputted via the cable 96a to the PC interface 96 from an external PC 98 and forms on the recording paper 24 an image produced at the PC 98 side.

The printer unit 74 also performs intermediary processes such as: transmitting commands, data, and the like, such as maker name request commands, function data request commands, and function setting data, received from the computer 98 to the facsimile unit 72 via the gate array 76; and transmitting maker names, function data, and the like received from the facsimile unit 72 to the computer 98.

The ROM 94 includes an storage buffer memory 94a and a recording buffer memory 94b. The storage buffer memory 94a is for temporarily storing PC data transmitted from the computer 98 in PC data recording processes while facsimile data is being printed out. The storage buffer memory 94a is for further temporarily storing a communication between the facsimile unit 72 and the computer 98 when the printer portion 74 serves as an intermediary between the two. The recording buffer memory 94b is for temporarily storing one page's worth of print data.

The computer 98 can be a general type computer that includes: a CPU 102, a ROM 104, a RAM 106, a liquid crystal display (LCD) 108, a floppy disk drive (FDD), 110, a hard disk unit (KD) 112, a key input portion 114, an input/output interface 116 a mouse input device 117, and a bus 118. Because the input/output interface 116 is connected by the cable 96a with the PC interface 96 of the printer unit 74, transmission and reception of signals between the computer 98 and the facsimile machine 2 via the input/output interface 116 is possible.

Next, the processes executed by the computer 98 will be explained based on the flowcharts shown in FIGS. 4 through 6. Steps of the flowcharts are indicated in the text and the drawings as Si, wherein i equals the number of the individual step. For example step 1 would be indicated as S1.

Figure 4:
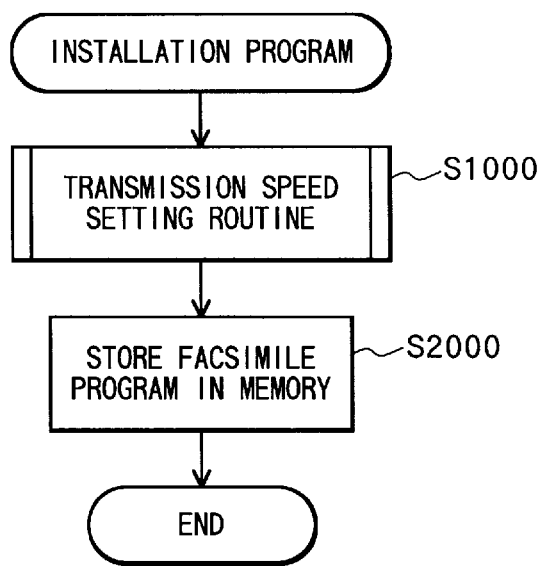
FIG. 4 is a flowchart representing processes for installing a facsimile process program.
Figure 14:
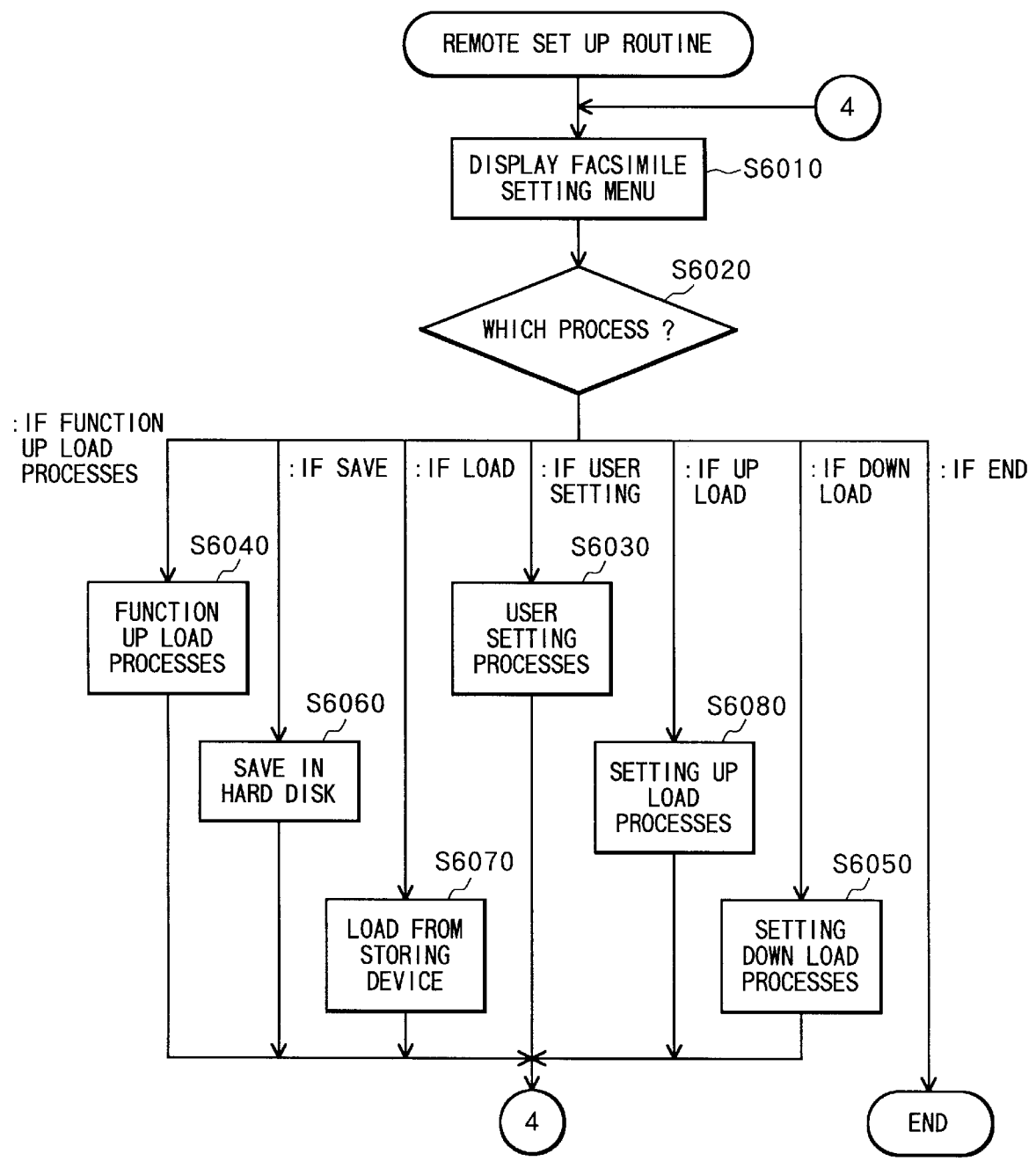
FIG. 14 is a flowchart representing processes performed in the computer for remote set up of various processes.

FIG. 4 shows a flowchart representing procedures followed during installation into the computer 98 of a facsimile routine shown in FIG. 14. An installation routine for installing the facsimile routine is stored as, for example, an execution program on a floppy disk with the facsimile program. When the facsimile process program is to be installed in the hard disk 112 of the computer 98, the installation routine is loaded and started up in the computer 98.

While the operation system is starting up, a user inserts into the floppy disk drive 110 the floppy disk storing the installation process program and the facsimile process program, then inputs a start up command of the installation process program via the key input portion 114. The operation system loads the installation process program into the RAM 106 and executes the program.

Figure 12:
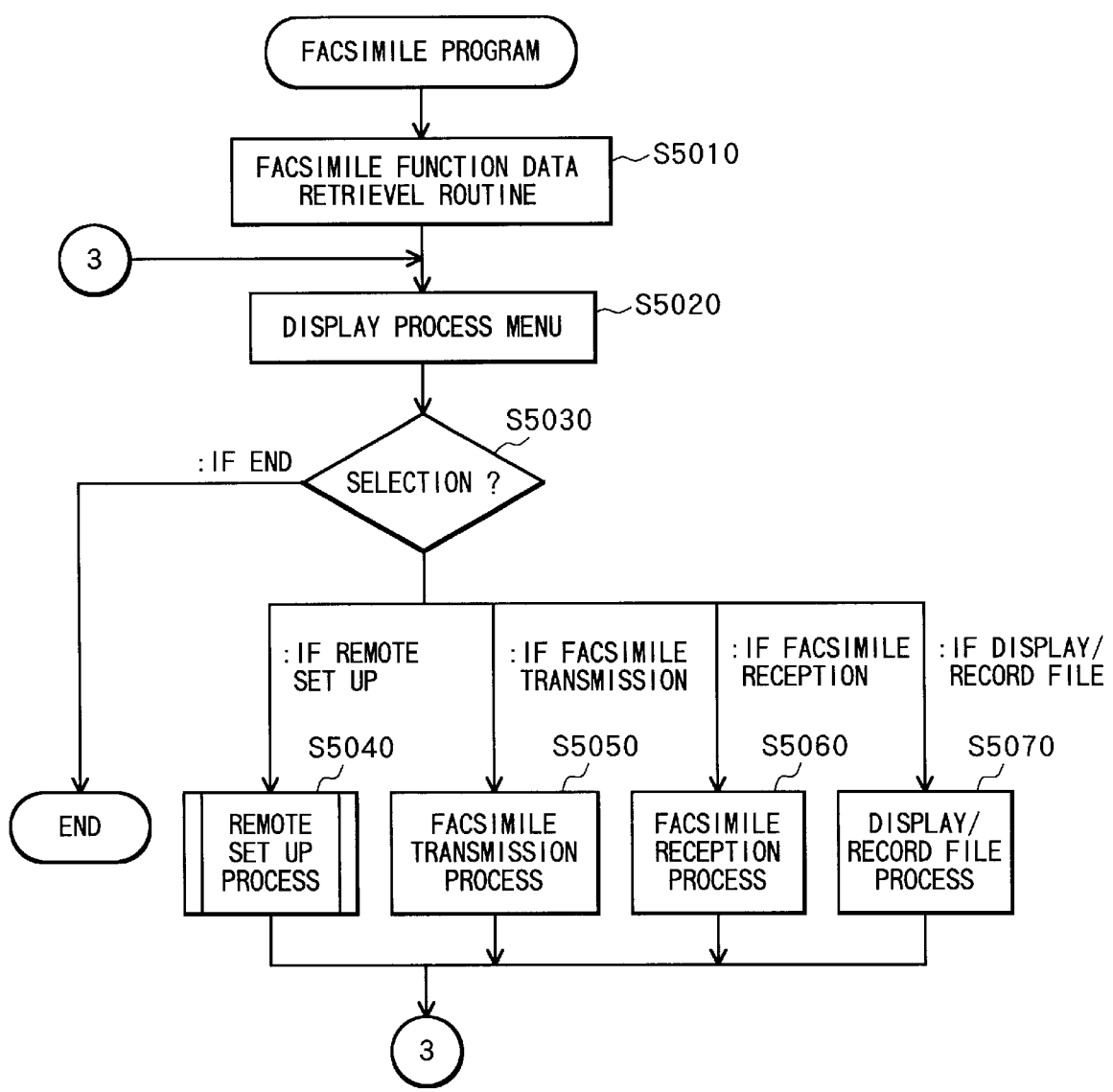
FIG. 12 is a flowchart representing a facsimile process program of the computer.
Figure 13:
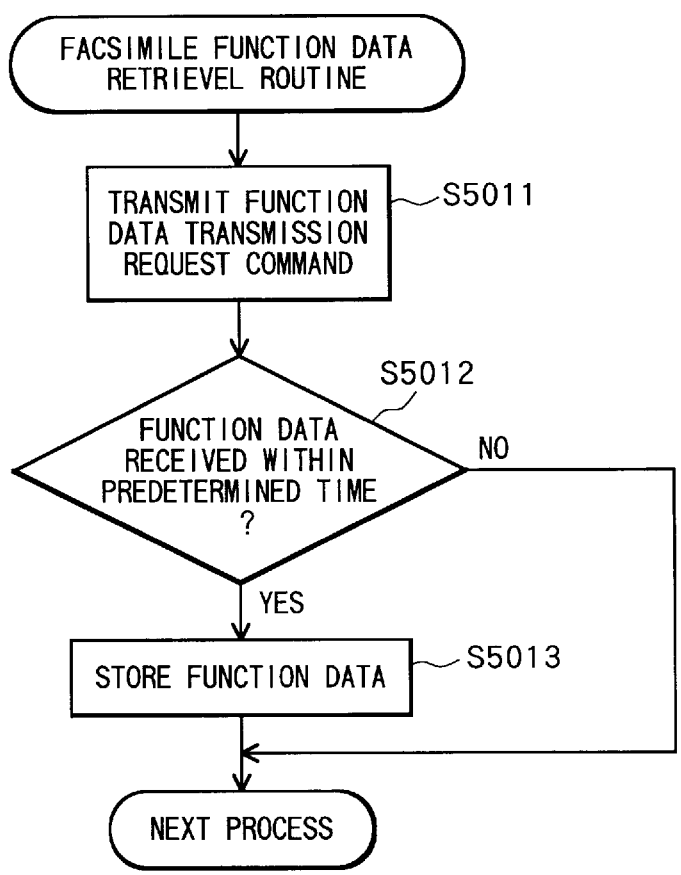
FIG. 13 is a flowchart representing processes performed in the computer for acquiring facsimile function data.

First, a transmission speed setting process is performed in S1000. Then, the facsimile process program represented by the flowcharts shown in FIGS. 12 through 14 are installed from the floppy disk to the hard disk 112, which serves as a memory of the computer 98.

Figure 7:
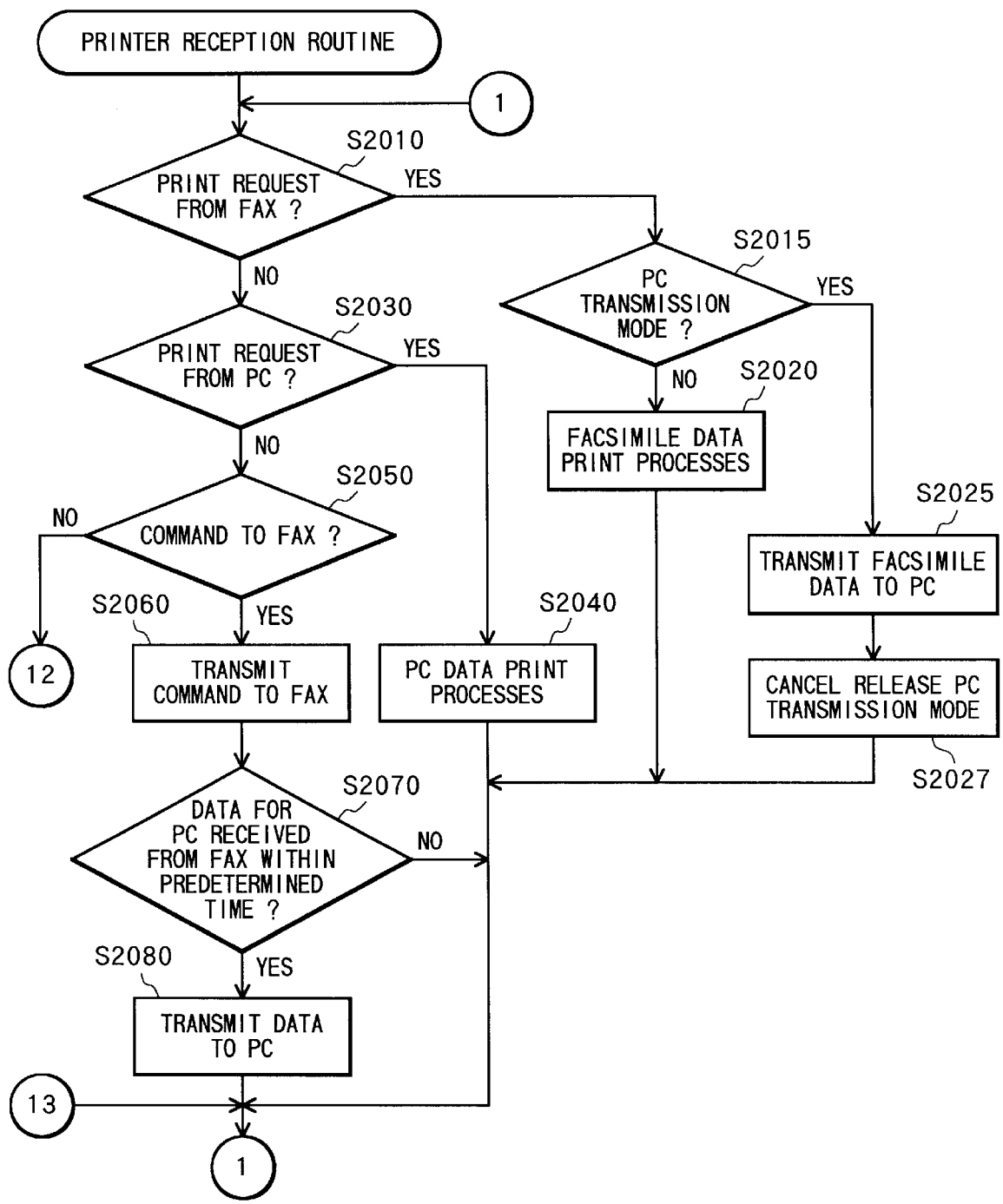
FIG. 7 is a flowchart representing processes performed in a printer section of the facsimile machine for performing reception.
Figure 8:
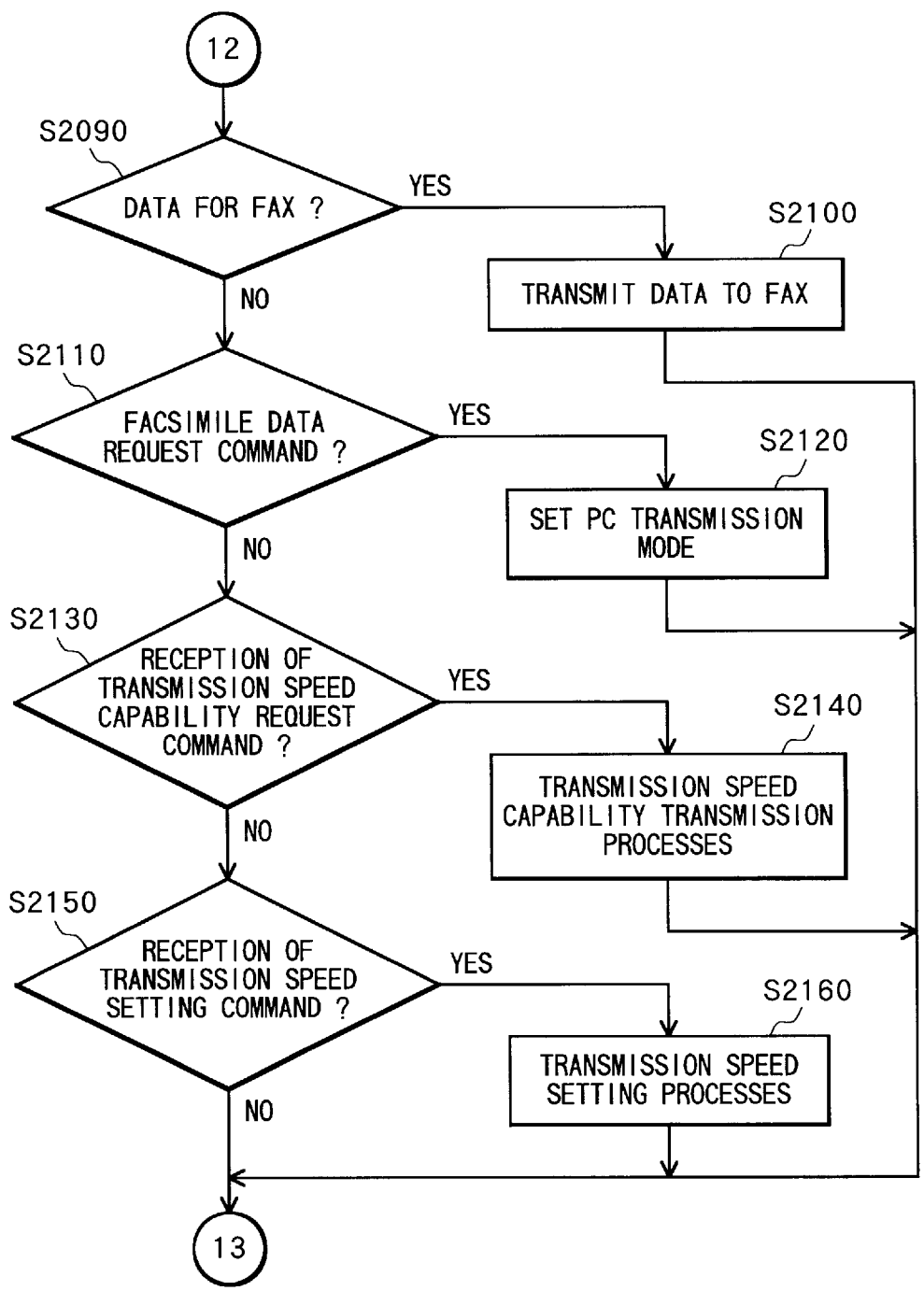
FIG. 8 is a flowchart representing processes performed in a printer portion of the facsimile machine for performing reception.
Figure 9:
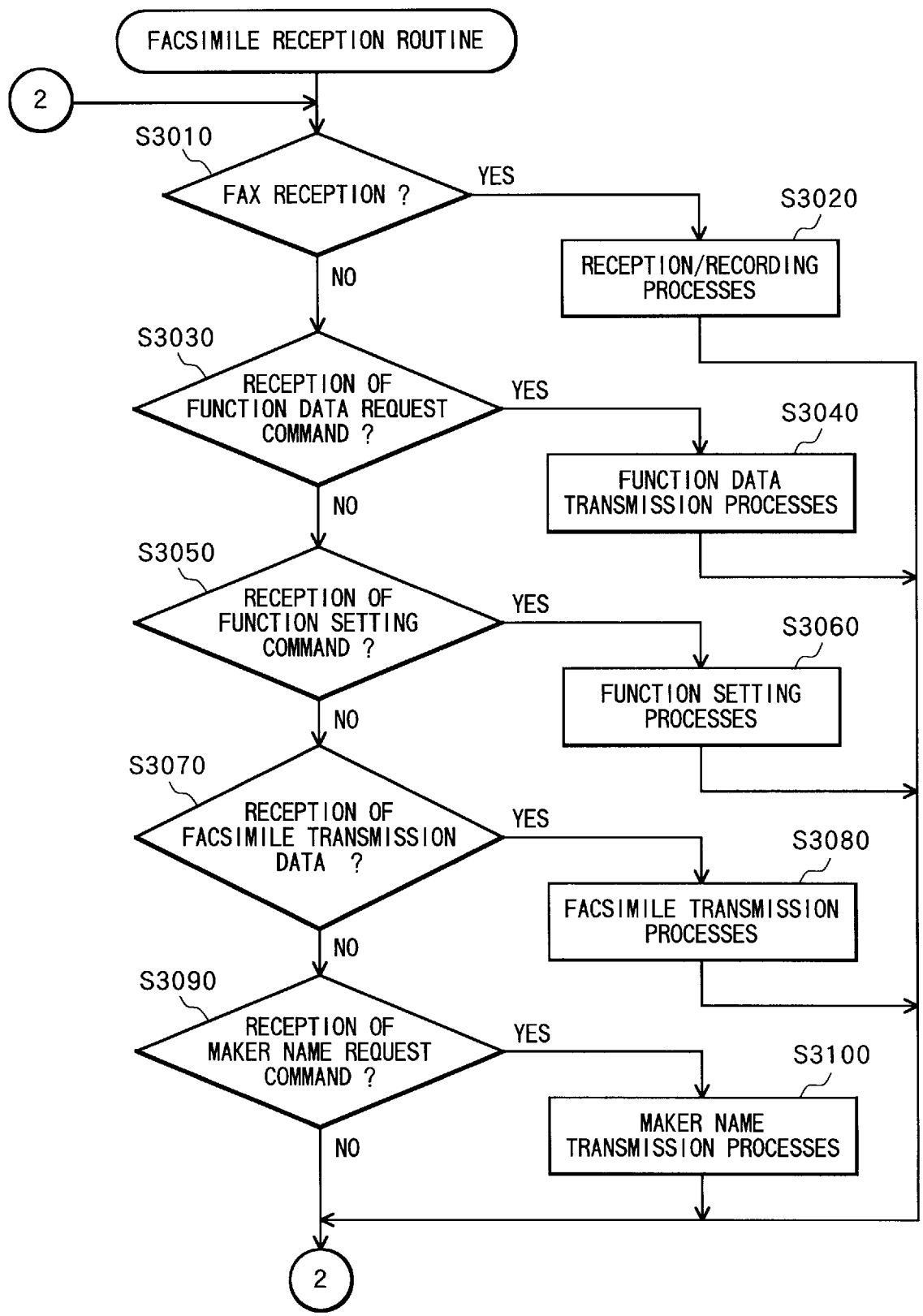
FIG. 9 is a flowchart representing processes performed in a facsimile portion of the facsimile machine for performing reception.

The details of the transmission speed setting process of S1000 executed by the computer 98 will be described in detail while referring to the flowcharts shown in FIGS. 5 and 6. In this connection, FIGS. 7 and 8 show reception processes performed in the printer unit 74 and FIG. 9 shows reception processes performed in the facsimile unit 72. The processes represented by FIGS. 5 through 9 are intimately related so FIGS. 5 through 9 will be referred to in the following description as needed.

First, the transmission speed of the input/output interface 116 in the computer 98 is set to 9.6 Kbps in S1010. Next, a maker name request command is transmitted to the facsimile machine 2 in S1020. Whether or not the maker name was received is determined in S1030.

In the present embodiment, the facsimile unit 72 stores the maker name of the facsimile machine 2 in its ROM 82. Also, the printer unit 74 of the facsimile machine 2 is capable of transmitting at speeds of 9.6 Kbps and 19.2 Kbps. Further, the PC interface 96 is set to a transmission speed of 19.2 Kbps.

Therefore, at S1020 the transmission speeds of the computer 98 and the facsimile machine 2 do not match because the computer 98 is transmitting at a speed of 9.6 Kbps. Therefore, the facsimile machine 2 will not perform processes needed to start reception of the maker name request command. The facsimile machine 2 will therefore not transmit its maker name so the computer 98 will not receive the maker name.

Accordingly, S1030 will result in a negative determination, whereupon the transmission speed of the computer 98 is set to 19.2 Kbps in S1040. A transmission speed capability request command is transmitted to the facsimile machine 2 at the transmission speed of the 19.2 Kbps in S1050. Whether or not transmission speed capability of 19.2 Kbps exists in the response from the facsimile machine 2 is determined in S1060.

Because the computer 98 transmitted the command in S1050 at the same transmission speed of 19.2 Kbps to which the printer unit 74 is set, the printer unit 74 is capable of receiving the command and recognizing that the signal is a transmission speed capability request command. Accordingly, the printer unit 74 makes a positive determination in S2130 shown in the flowchart of FIG. 8. The facsimile machine 2 transmits data on the transmission speeds at which the printer unit 74 is capable of transmitting and receiving, that is, 9.6 Kbps and 19.2 Kbps, to the computer 98 in S2140.

When the computer 98 receives the data on transmission speed capability, S1060 results in a positive determination because in this example the data on transmission speed capability includes 19.2 Kbps. Next, a command for setting the transmission speed to 19.2 Kbps is transmitted to the facsimile machine 2 in S1080. Then, whether or not an "OK" response is received is determined in S1090.

In regards to this command, a positive determination is made in the printer unit 74 of the facsimile machine 2 in S2150 shown in FIG. 8. The printer unit 74 sets the transmission speed of the PC interface 96 to 19.2 Kbps. Once this setting is complete, the printer unit 74 transmits an "OK" signal to the computer 98 in S2160.

The "OK" response will result in a positive determination in the computer 98 in S1090, whereupon data representing the transmission speed of 19.2 Kbps is stored in the hard disk 112 or the RAM 106 in S1100. In this way, the computer 98 sets its own transmission speed to one at which both it and the facsimile machine 2 are capable of transmitting and receiving. This ends the transmission speed setting process.

When the transmission speed for the PC interface 96 in the printer unit 74 is set from the start to 9.6 Kbps, the printer unit 74 recognizes the maker name request command transmitted from the computer 98 in S1020 as a command to the facsimile unit 72. This results in a positive determination in S2050 of the flowchart of FIG. 7, whereupon the printer unit 74 transmits the maker name request command to the facsimile unit 72 via the gate array 76 in S2060. Then, the printer unit 74 determines whether or not data in response to the request from the computer 98 has been received from the facsimile unit 72 within a predetermined period of time in S2070.

When the facsimile unit 72 receives this maker name request command, it makes a positive determination in S3090 of FIG. 9 and transmits the maker name to the printer unit 74 in S3100.

When a maker name is transmitted from the facsimile unit 72, the printer unit 74 makes a positive determination in S2070 and then transmits the maker name to the computer 98 in S2080.

Figure 6:
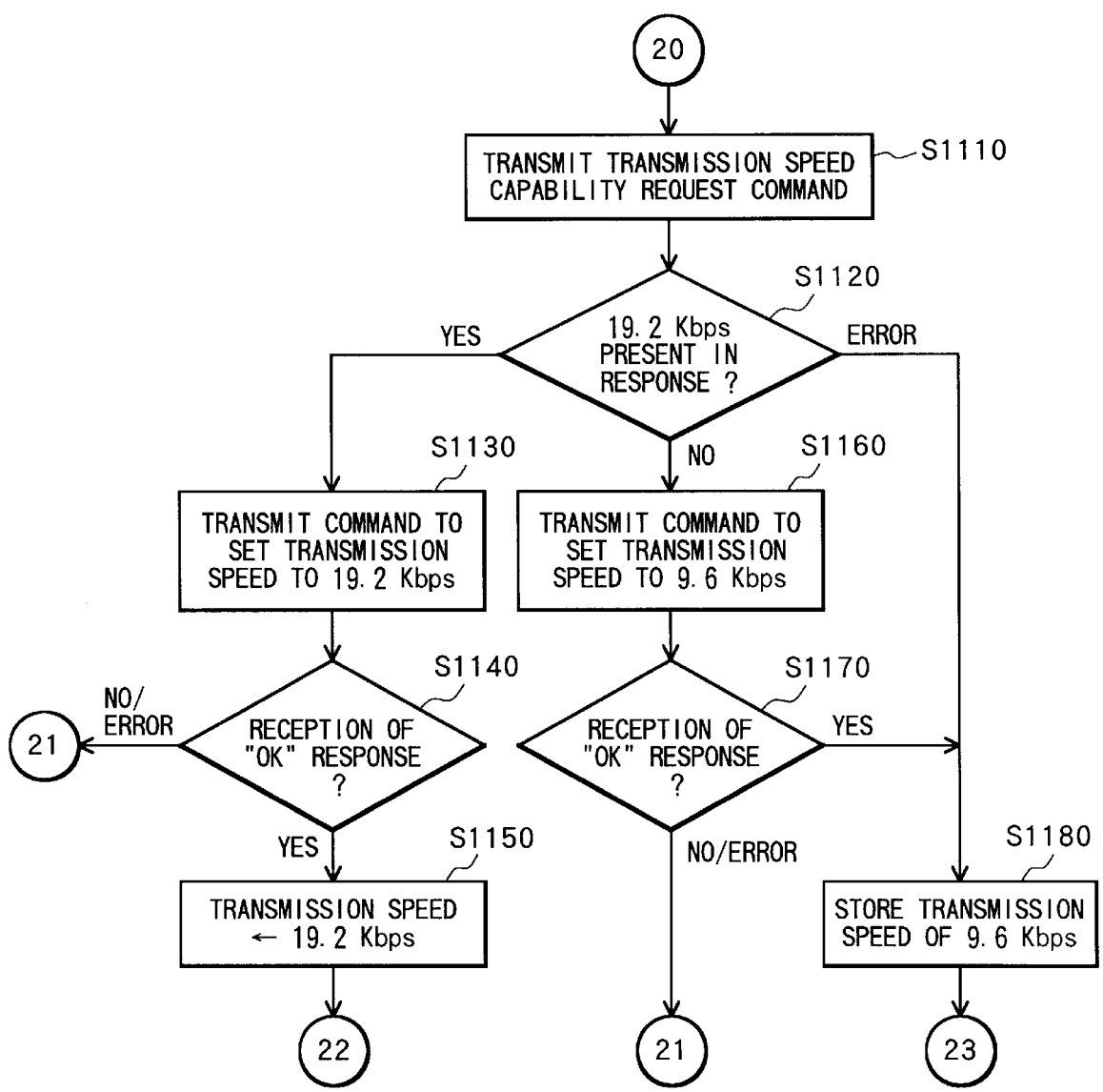
FIG. 6 is a flowchart representing processes performed in the computer for setting transmission speed.

Because the computer 98 receives the maker name, S1030 results in a positive determination, whereupon the program proceeds to processes represented by the flowchart in FIG. 6. The computer 98 transmits the transmission speed capability request command to the facsimile machine 2 in S1110. Next, the computer 98 determines in S1120 whether or not the response from the facsimile machine 2 includes data on transmission speed capability of 19.2 Kbps.

When the printer unit 74 receives the transmission speed capability request command, it makes a positive determination in S2130 and transmits the transmission speed capability in S2140.

Because the PC interface 96 of the printer unit 74 is capable of transmitting at 19.2 Kbps, the speed of 19.2 Kbps is included in the response. Therefore, S1120 results in a positive determination. Next, the computer 98 transmits the command for setting the transmission speed of the facsimile machine 2 to 19.2 Kbps in S1130 and then determines whether or not an "OK" response is received in S1140.

This command from the computer 98 results in the printer unit 74 of the facsimile machine 2 making a positive determination in S2150 shown in FIG. 8. In S2160, the printer unit 74 then sets the transmission speed of the PC interface 96 to 19.2 Kbps and, once setting processes are complete, transmits an "OK" signal to the computer 98.

Because the computer 98 receives an "OK" from the printer unit 74, the computer 98 makes a positive determination in S1140 and sets its own transmission speed to 19.2 Kbps in S1150. In this way, the computer 98 sets its own transmission speed to one at which both it and the facsimile machine 2 are capable of transmission. Next, at the transmission speed of 19.2 Kbps, the computer 98 transmits to the facsimile machine 2 a command for setting the transmission speed of the facsimile machine 2 to 19.2 Kbps in S1080. Then in S1090, the computer 98 determines whether or not an "OK" response has been received.

In regards to this command, the printer unit 74 of the facsimile machine 2 makes a positive determination in S2150 of the flowchart in FIG. 8. In S2160, the printer unit 74 again sets the transmission speed of the PC interface 96 to 19.2 and, once setting operations are completed, transmits an "OK" signal to the computer 98.

Because the computer 98 receives an "OK" response, it makes a positive determination in S1090 and stores data for the transmission speed of 19.2 Kbps in the hard disk 112, the RAM 106 and the like in S1100. This completes the transmission speed setting process.

When the computer 98 determines in S1120 that the response contains no data for a transmission speed of 19.2 Kbps, that is, when the PC interface 96 of the printer unit 74 is only capable of transmitting at a speed of 9.6 Kbps, then S1120 results in a negative determination. Next, in S1160, the computer 98 transmits a command for setting transmission speed of the facsimile machine 2 to 9.6 Kbps. The computer 98 then determines whether or not an "OK" response has been received in S1170.

Upon receipt of this command from the computer 98, S2150 of the flowchart in FIG. 8 results in a positive determination. Because the printer unit 74 can be set to 9.6 Kbps, in S2160, the printer unit 74 sets the transmission speed of the PC interface 96 to 9.6 Kbps and after settings are completed, the printer unit 74 transmits an "OK" signal to the computer 98.

When the computer 98 receives this "OK" signal, then S1170 results in a positive determination. The computer 98 then stores data for a Transmission speed of 9.6 Kbps in the hard disk 112, RAM 106, and the like in S1180. In this way, the computer 98 sets its own transmission speed to one at which both it and the facsimile machine are capable of transmission. This ends the transmission speed setting process. An error condition arises when no signal is received in step 1120. However, because as a result of S1030 it can be concluded that the printer unit 74 is capable of a transmission speed of 9.6 Kbps. Therefore, the transmission speed is set to 9.6 Kbps in S1180.

Although not shown in the flowchart in FIG. 6, the processes after a positive determination in S1030 are easier to perform when the response from the facsimile machine 2 indicates that the computer 98 and the facsimile machine 2 are made by the same company than when the response indicates that the computer 98 and the facsimile machine 2 are made by different companies. Therefore, in the present embodiment, the computer 98 first transmits an inquiry for maker name to the facsimile machine 2 before transmitting a transmission speed capability request command.

However, processes for transmitting the maker name request can be omitted. In this case, a transmission speed capability request command could be transmitted at a predetermined speed at the start of the transmission speed setting routine. When no response is received to the command, the computer could change speeds and retransmit the command until a response is received. The transmission speed could then be set based on the content of the response. Alternatively, the transmission speed could be set to the transmission speed of the transmission speed capability request command that elicited the response, because it can be assumed that the remote device is capable of reception at this transmission speed.

The common point in all these cases is that processes for determining common transmission speed are started by an inquiry command transmitted at a relatively high transmission speed by the computer 98. Therefore, these processes can be performed at a much higher transmission speed than the 300 bps transmission speed conventionally used by facsimile machines at the start of processes.

It should be noted that data representing impossibility of transmission is stored in the hard disk 112, the RAM 106, and the like in S1070 and transmission speed setting processes are completed under any of the following three conditions: first when the computer 98 transmits a maker name request command in S1020, but receives in S1030 no maker name (S1030:NO), and then further transmits a transmission speed capability request command in S1050, and either receives in S1060 a response having no transmission speed capability of 19.2 Kbps (S1060:NO) or receives no response at all (S1060:ERROR); secondly, when the computer 98 transmits a command for setting transmission speed to 19.2 Kbps either in S1080 or S1130, but receives no "OK" response in either S1090 or S1140 (S1090:NO/ S1140:NO); and thirdly, when the computer 98 transmits a command for setting transmission speed to 9.6 Kbps in S1160, but receives no "OK" response in S1170 (S1170:NO/ ERROR).

The processes performed in the printer portion 74 represented by the flowcharts in FIGS. 7 and 8 include other processes in addition to those described above. First, in S2010, the printer portion 74 determines whether an incoming signal is a print command from the facsimile unit 72. If so (S2010:YES), and the facsimile machine 2 is not in a computer transmission mode (to be described later) (S2015:NO), then in S2020 the printer unit 74 receives facsimile data transmitted from the facsimile unit 72 and uses the recording unit 26 to record the facsimile data on recording sheets 24 from the document tray 20.

If the incoming signal is not a printer command, the printer unit 74 determines in S2030 whether or not an incoming signal is a print request from the computer 98. If so, (S2030:YES), then the printer unit 74 receives PC data transmitted from the computer 98 and uses the recording unit 26 to record the PC data on recording sheets 24 in S2040.

When the incoming signal is not a print request command from the printer unit (S2030:NO), then the printer unit 74 determines, as described above, whether or not the incoming signal is a command to be transmitted to the facsimile unit 72. If so, (S2050:NO), then the printer 74 determines in S2090 of FIG. 8 whether or not the reception is data for the facsimile unit 72. If so (S2090:YES), the data is transmitted to the facsimile unit 72 via the gate array 7 in S2100. If the data is not for the facsimile unit 72 (S2090:NO), then whether or not the data is a command requesting that the printer unit 74 itself provide facsimile data, that is, a facsimile data request command, is determined in S2110. If so (S2110:YES), then the printer unit 74 is set to the computer transmission mode in S2120. By doing this, S2015 results in a positive determination when the printer unit 74 receives a print request command from the facsimile unit 72. In this case, the facsimile data received from the facsimile unit 72 is transmitted in S2025 to the computer 98 without being printed. Afterward, the computer transmission mode is cancel released in S2027.

It should be noted that the program will return to S2010 after S2020, S2027, S2040, S2080, S2100, S2120, S2140, or S2160 or when a negative determination is made in S2070 or S2150.

The facsimile unit 72 also executes other processes in addition to those described above. For example, when the facsimile unit 72 receives a call over the telephone circuit, it determines in S3010 whether or not the call is a facsimile signal. If so (S3010:YES), in the normal manner the facsimile unit 72 receives, decodes, and then transmits the facsimile data to the printer unit 74, where the facsimile data is subjected to recording processes in S3020. When it is determined in S3010 that no facsimile data has been received, then whether or not a function data transmission request command has been received is determined in S3030. When a function data transmission request command has been received using the function upload processes to be described later in conjunction to S6040 of FIG. 14 (S3030:YES), then the facsimile unit 72 transmits function data, which represents functions the facsimile unit 72 is capable of performing, to the printer unit 74 in 3040. As described previously, the printer unit 74, having received this function data, transmits it to the computer 98 in S2080 of FIG. 7.

The computer 98, having received function data, stores it as a file in the RAM 106, the hard disk 112, and the like in the function upload processes of S6040.

When the incoming data is not a function data transmission request command (S3030:NO), then whether or not function setting data of the facsimile unit 72 has been received from the computer 98 is determined in S3050. If so (S3050:YES), then the Facsimile unit 72 sets its own functions according to the function setting data in S3060.

If the incoming data is not function setting data, then whether or not facsimile transmission data is being received from the computer 98 via the printer unit 74 is determined in S3070. When facsimile transmission data is received (S3070:YES), then in S3080 the facsimile unit 72 executes facsimile transmission processes for transmitting, as facsimile data, image data in the facsimile transmission data to a telephone number either indicated in the facsimile transmission data or indicated by the operation panel 14. When S3070 results in a negative determination, whether or not a maker name request command has been received is determined in S3090. If so (S3090:YES), then the maker name is transmitted in S3100 in the manner described above. If not (S3090:NO), then the program returns to S3010. The program also returns to S3010 after processes of S3020, S3040, S3060, S3080, and S3200 are performed.

Figure 11:
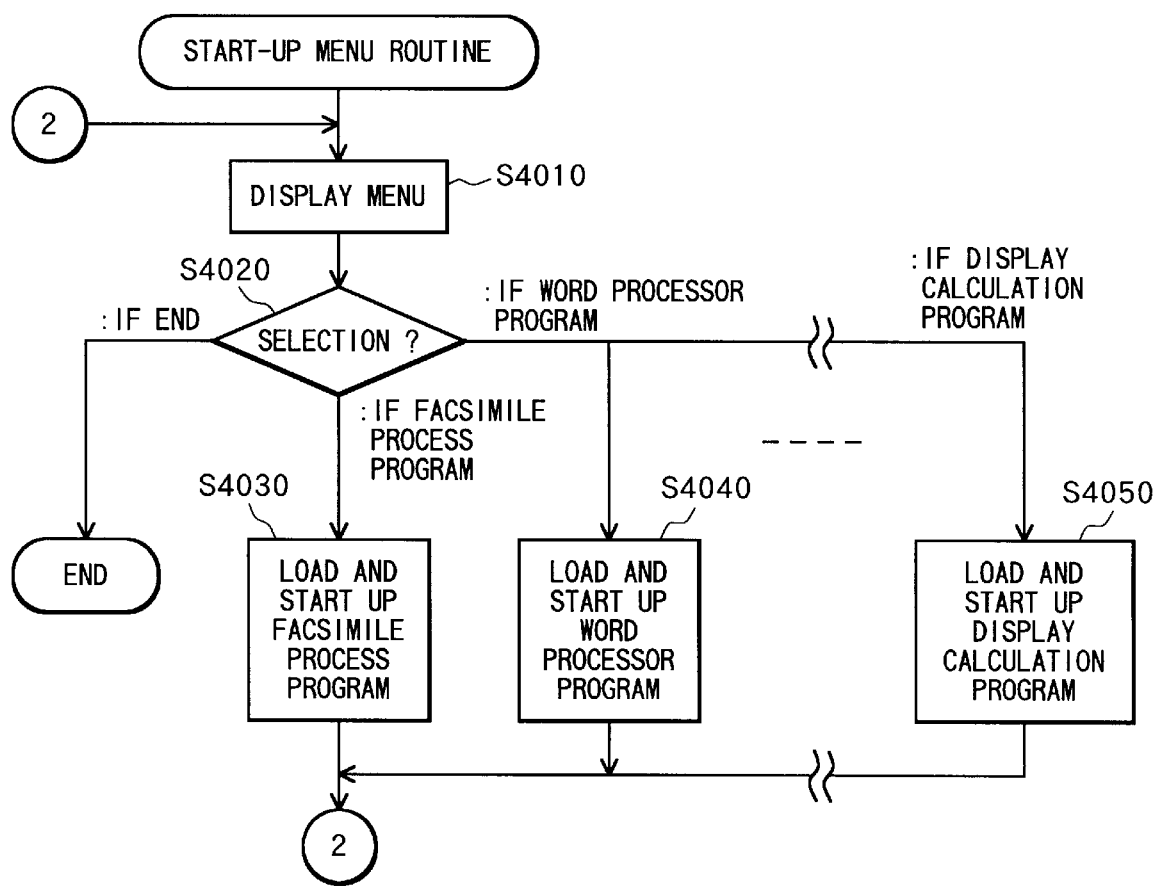
FIG. 11 is a flowchart representing processes performed in the computer for displaying a start-up menu.

An explanation of the functions of the facsimile process program installed in the hard disk 112 during S2000 of FIG. 4 will be provided. A user selects the facsimile processes program using start-up menu processes shown in the flowchart of FIG. 11.

When the start-up menu processes are started by input of a start-up command, first, a menu is displayed in S4010. The menu is a menu for selecting programs the user wants to start up. The menu shows, for example, names of programs such as a facsimile process program, a word processor program, or a display calculation program. When the user selects, as determined in S4020, a desired program from the programs on the menu using either the key input portion 114 or the mouse 117, then the selected program is loaded from the hard disk 112 into the RAM 106 of the computer 98 and started up in S4030, S4040, or S4050.

For example, if the facsimile process program is selected, then the facsimile process program to be described later is loaded and started up in S4030. Then the computer 98 operates as a processor for setting functions and performing other processes with regards to the facsimile unit 72. If the word process program is selected, then the word processor program is loaded and started up in S4040, whereupon the computer 98 operates as a word processor. If the display calculation program is selected, then the display calculation program is loaded and started up in S4050, whereupon display calculation processes are started. If the user selects to end processes, the start-up menu processes are ended.

Next, based on the flowchart shown in FIG. 12, an explanation will be provided for the facsimile process program started up when a user selects the facsimile process program category of the start-up menu.

Figure 10:
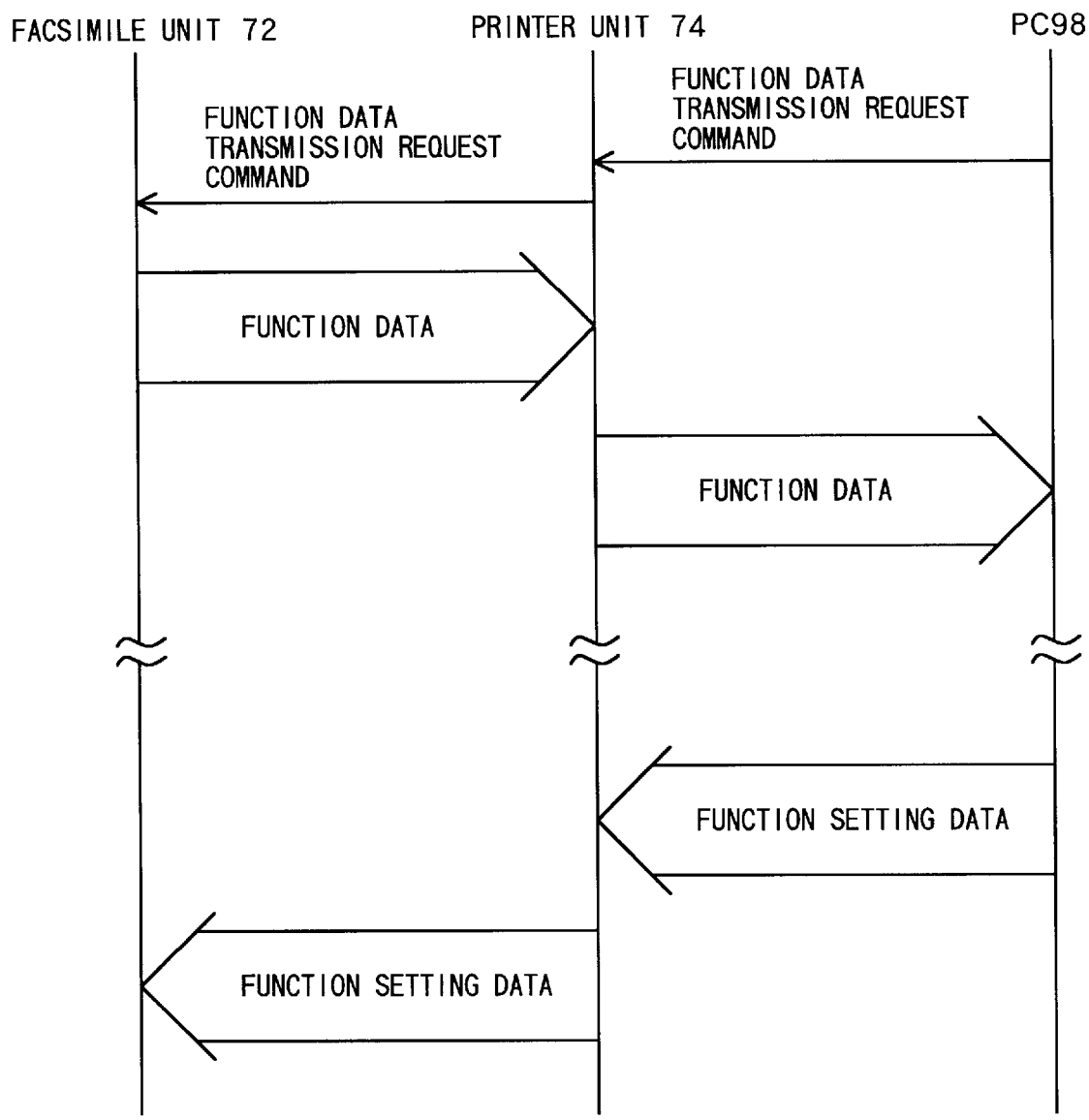
FIG. 10 is a sequence chart representing an example of transmission condition between the computer, the printer portion, and the facsimile portion.

When facsimile processes are started, then the function data for the facsimile unit 72 is retrieved in S5010 from the work region of the RAM 106 using a facsimile function data retrieval routine represented by the flowchart shown in FIG. 13. It should be noted that various transmissions performed between the computer 98, the printer unit 74, and the facsimile unit 72 during the facsimile function data retrieval routine are shown in FIG. 10.

During the facsimile function data retrieval routine, the computer 98 transmits in S5011 a function data transmission command to the facsimile machine 2. Then, in S5012, the computer 98 determines whether or not it has received within a predetermined period of time the function data that the facsimile machine 2 should send after receiving the function data transmission command. If the computer 98 receives the function data within the predetermined period of time (S5012:YES), then the function data is stored in the work area of the RAM 106 in S5013. In this case the function data is simultaneously stored in the hard disk 112.

It should be noted that, when the computer 98 transmits the function data transmission request command in the processes performed in S5011, then S2050 will result in a positive determination so that the printer unit 74 transmits in S2060 the command to the facsimile unit 72 via the gate array 76.

When the facsimile unit 72 receives the function data transmission request command, then S3030 will result in a positive determination so that the facsimile unit 72 retrieves function data from in its ROM 82 and transmits the function data to the printer unit 74 via the gate array 76 in S3040. Although in the present embodiment the function data is stored in the ROM 82, it could alternatively be stored in the work area of the RAM 84.

After transmitting the command to the facsimile unit 72 in S2060, the printer unit 74 determines in S2070 whether or not it has received PC data from the facsimile unit 72 within a predetermined period of time. If so, then the printer unit 74 transmits function data to the computer 98 in S2080. The computer 98 receives the function data accordingly so that S5012 results in a positive determination (S5012:YES), whereupon the function data is stored in the work area of the RAM 106 in S5013.

Next, the process menu is displayed in S5020. The process menu includes categories such as "REMOTE SET UP," "FACSIMILE TRANSMISSIONS," "FACSIMILE RECEPTION," "FILE DISPLAY/RECORD," and "END." The program awaits selection of one of these categories in S5030.

When the "REMOTE SET UP" category is selected, then a remote set up process to be described later is executed in S5040.

When the "FACSIMILE TRANSMISSION" category is selected, then facsimile processes for using the facsimile machine 2 to transmit the image data to a remote facsimile machine are performed when the computer 98 transmits image data to the facsimile machine 2. Said in more detail, when the computer 98 transmits image data stored in the hard disk 112 to the printer unit 74, then S2090 of shown in FIG. 8 results in a positive determination in the printer unit 74, whereupon the printer unit 74 transmits the image data from the computer 98 to the facsimile unit 72 in S2100. This in turn results in a positive determination in the facsimile unit 72 in S3070 shown in FIG. 9, whereupon the facsimile unit 72 transmits in S3080 the image data to a remote facsimile machine indicated by a telephone number accompanying the image data.

When the "FACSIMILE RECEPTION" category is selected, then processes are performed for receiving facsimile data as image data directly from the facsimile machine 2 and storing the data in the hard disk 112 and the like. That is, as one process represented by S5060, the computer 98 transmits a facsimile data request command to the printer unit 74. This results in a positive determination in S2110 of the printer unit 74, whereupon the printer unit 74 sets itself to the computer transmission mode in S2120. When directly after this the printer unit 74 receives a print request from the facsimile unit 72 (S2010:YES), then S2015 will result in a positive determination, whereupon the printer unit 74 transmits to the computer 98 in S2025 the facsimile data received from the facsimile unit 72. Afterward, the PC transmission mode is cancel released in S2027. Then, again within S5060, the computer 98 stores the facsimile data received from the printer unit 71 in the hard disk 112 and the like.

When the "FILE DISPLAY/RECORD" category is selected, then file display or record processes are performed in S5070. That is, facsimile data stored in the hard disk 112 and the like during the processes for the "FACSIMILE RECEPTION" is either displayed on the LCD 108 or transmitted to the facsimile machine 2 where it is recorded.

If the "END" category is selected in S5030, then facsimile processes are ended.

Next, remote set up processes will be explained while referring to FIG. 14.

Figure 15:
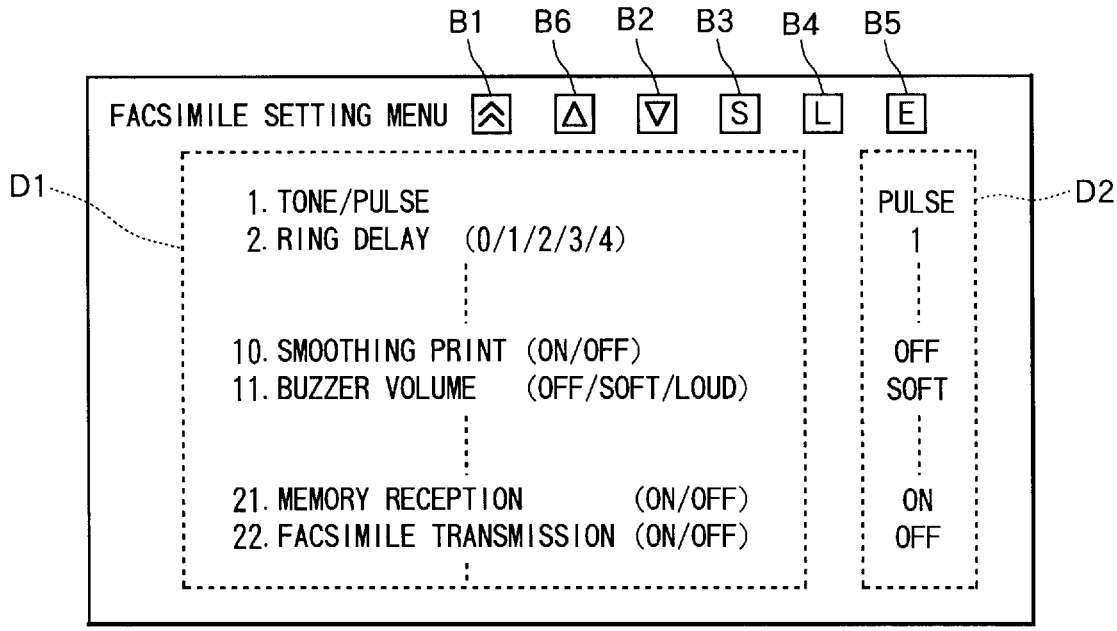
FIGS. 15(a) and 15(b) are schematic views of facsimile setting menus displayed on a display of the facsimile machine.
Figure 15:
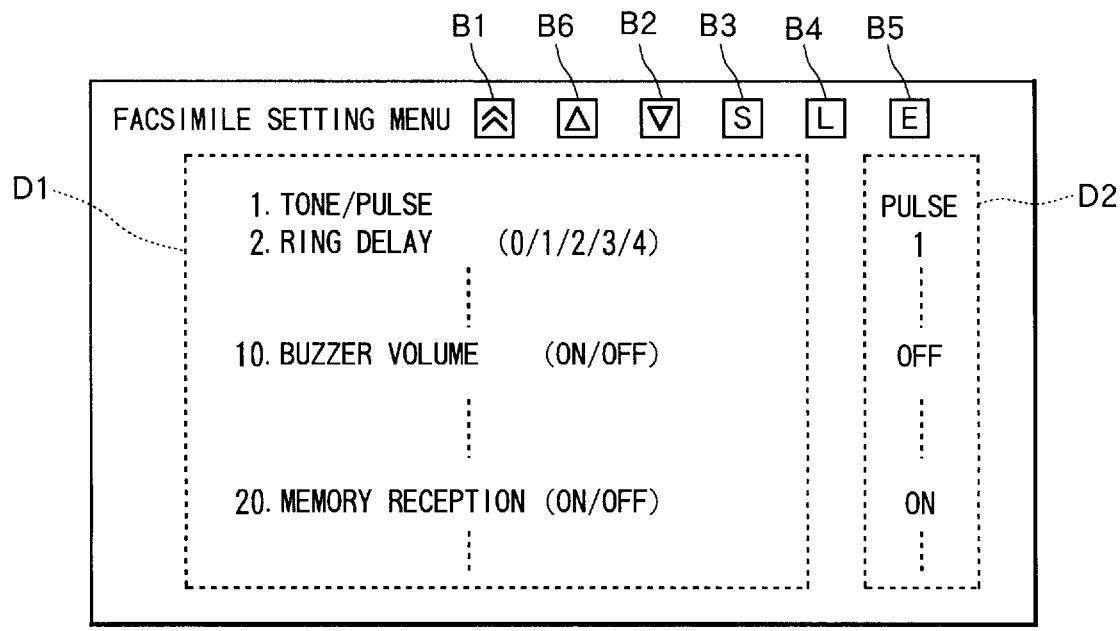

First, a facsimile setting menu is displayed on the LCD 108 in S6010 based on data for operating the facsimile unit 72 to function as facsimile machine. The function data is written in the work area of the RAM 106 in S5010. FIG. 15 (a) shows an example display. In this display, the regions D1 and D2 are displayed based on function data of the facsimile unit 72. The region D1 displays all the functions provided to the facsimile machine 2 and settings at which the functions can be set. Region D2 displays the settings to which the various functions of the facsimile machine 2 are presently set. Default values from the facsimile process program are displayed in region D2 when the facsimile setting menu is first displayed. Of course, if as a result of processes of S5011, tie facsimile unit 72 transmits its present function settings in addition to information on the functions of which it is capable, then the computer 98 can also display in the region D2 the present settings of the facsimile unit 72 instead of the default settings.

Then, the program waits for the user to select a process in S6020. For example, to select "LOUD" for the "BUZZER VOLUME" category from the three choices of "OFF," "SOFT," and "LOUD," an operator uses the mouse 117 to align the curser with "LOUD" on the display, and then clicks the left button on the mouse 117, whereupon for "BUZZER VOLUME," "SOFT" will change to "LOUD" in region D2. Processes for changing settings are performed in the user setting processes of S6030. The settings are selected from the various functions that the facsimile unit 72 is capable of performing. That is, if the facsimile unit 72 has no smoothing print or facsimile transmission functions, then as shown in FIG. 15(b) the categories of "SMOOTHING PRINT" and "FACSIMILE TRANSMISSION" will not be displayed. As a result, a user will not attempt to set a category representing functions not provided to the facsimile unit 72, saving time and eliminating useless effort. Also, the user will not be confused by functions with unknown purposes so that users can effectively set the functions of the facsimile unit 72.

Function upload processes of S6040 are initiated by aligning the cursor with button B1 on the screen and selecting this function. During the function upload processes, the same processes are performed as in S5010 of FIG. 12, that is, as in the processes represented by the flowchart of FIG. 13. Files in the hard disk 112 storing function data on settings for functions of the facsimile unit 72 are updated to reflect the present settings of the facsimile unit 72. Also, the function data of the work region of the RAM 106 is updated in the same manner. Therefore, the facsimile setting menu displayed on the LCD 108 is also updated to reflect the new settings for each category. This is a helpful process for when the facsimile machine 2 is replaced with a different type facsimile machine.

Setting download processes of S6050 can be activated by aligning the cursor with button B2 on the screen and selecting this function. During the setting download processes, processes are performed for transmitting the settings shown in FIG. 15(a) and 15(b) to the facsimile machine 2 as function setting data shown in the lower portion of FIG. 10. This transmission of function setting data to the facsimile machine 2 results in the printer unit 74 making a positive determination in S2090, whereupon the function setting data is transmitted to the facsimile unit 72 in S2100. The facsimile unit 72 then makes a positive determination in S3050 of FIG. 9, whereupon the facsimile unit 72 sets in S3060 its own functions according to the function setting data received from the printer unit 74.

This allows a user to instantly set settings of the facsimile unit 72 to reflect the content set on the screen of the computer 98. Therefore, setting operations can be performed with extreme efficiency. Because the display faithfully shows the function the facsimile unit 72, the user can set functions of the facsimile unit 72 without confusion or without setting unnecessary or incorrect settings.

The settings on the display can be saved in the hard disk 112 by selecting button B3 using the mouse 117. By activating this process data representing function settings set by the user using the display are stored in the hard disk 112 as a file in S6060.

Files from the hard disk 112 can be loaded into the work area of the RAM 106 by selecting the button B4 using the mouse 113. By initiating this process in S6070 function setting data from the function setting data file saved in the hard disk 112 is written into the work area of the RAM 106 and displayed on the LCD 108 as shown in FIG. 15. Accordingly, this is helpful for referring to the setting content.

The remote set up processes can be ended by selecting the button B5.

Setting upload processes of S6080 are executed by selecting button B6. These processes are for transmitting, as function setting data, setting functions in the facsimile unit 72 from the facsimile unit 72 to the computer 98, via the printer unit 74 and then displaying the setting content on the region D2 as shown in FIGS. 15(a) and 15(b). That is, these processes are the opposite of those performed in S6050.

It should be noted that after any of the steps S6030 through S6080 are performed, then the program again returns to S6010.

In the embodiment with the above-described configuration, in particular the transmission speed setting process of S1000 during the installation processes for the facsimile process program shown in FIG. 4, the highest transmission speed common to both the facsimile machine 2 and the computer 98, that is, the transmission speed of 19.2 Kbps from the two transmission speeds of 9.6 Kbps and 19 Kbps, is automatically determined and automatically set as the transmission speed for the computer 98 and the facsimile machine 2. Then, transmission processes between the computer 98 and the facsimile machine 2 are executed at the highest transmission speed. Accordingly, a user need not go to the trouble of investigating transmission speed capability of the facsimile machine 2 to set the highest transmission speed common to the computer 98 and the facsimile machine 2.

In the first embodiment, the computer system 98 requested the facsimile machine 2 to transmit its transmission speed capabilities. The computer system 98 then compared the transmission speed capabilities of the facsimile machine 2 with its own transmission speed capabilities and automatically set the highest transmission speed. That is, the highest transmission speed of those transmission speeds common to both the facsimile machine and the computer system was set as the transmission speed.

When the device for setting data transmission speed is part of a computer system as described above, the computer system is constantly performing a plurality of routines at a time and also frequently performs various interrupt routines and the like. Under normal circumstances the computer system can easily perform transmission at the highest transmission speed. Therefore under normal circumstances it is desirable that the highest transmission speed at which both devices are capable be set as the transmission speed of both devices because this way efficiently of transmission is improved. However, there is a danger that when the computer system is burdened greatly by these other routines it will be unable to retrieve all of the incoming data at the highest speed so that some of the transmission data will be lost.

Next, a second embodiment for preventing loss of data will be described. The computer 98 and facsimile machine 2 of the second embodiment are configured in the same manner as described in the first embodiment while referring to FIGS. 1 through 3. As will be described below, processes performed in the computer 98 and facsimile machine 2 of the second embodiment are also similar to those performed in the first embodiment except for modifications to the transmission speed setting routine as shown in FIG. 16 and the remote set up routine as shown in FIG. 17.

Figure 16:
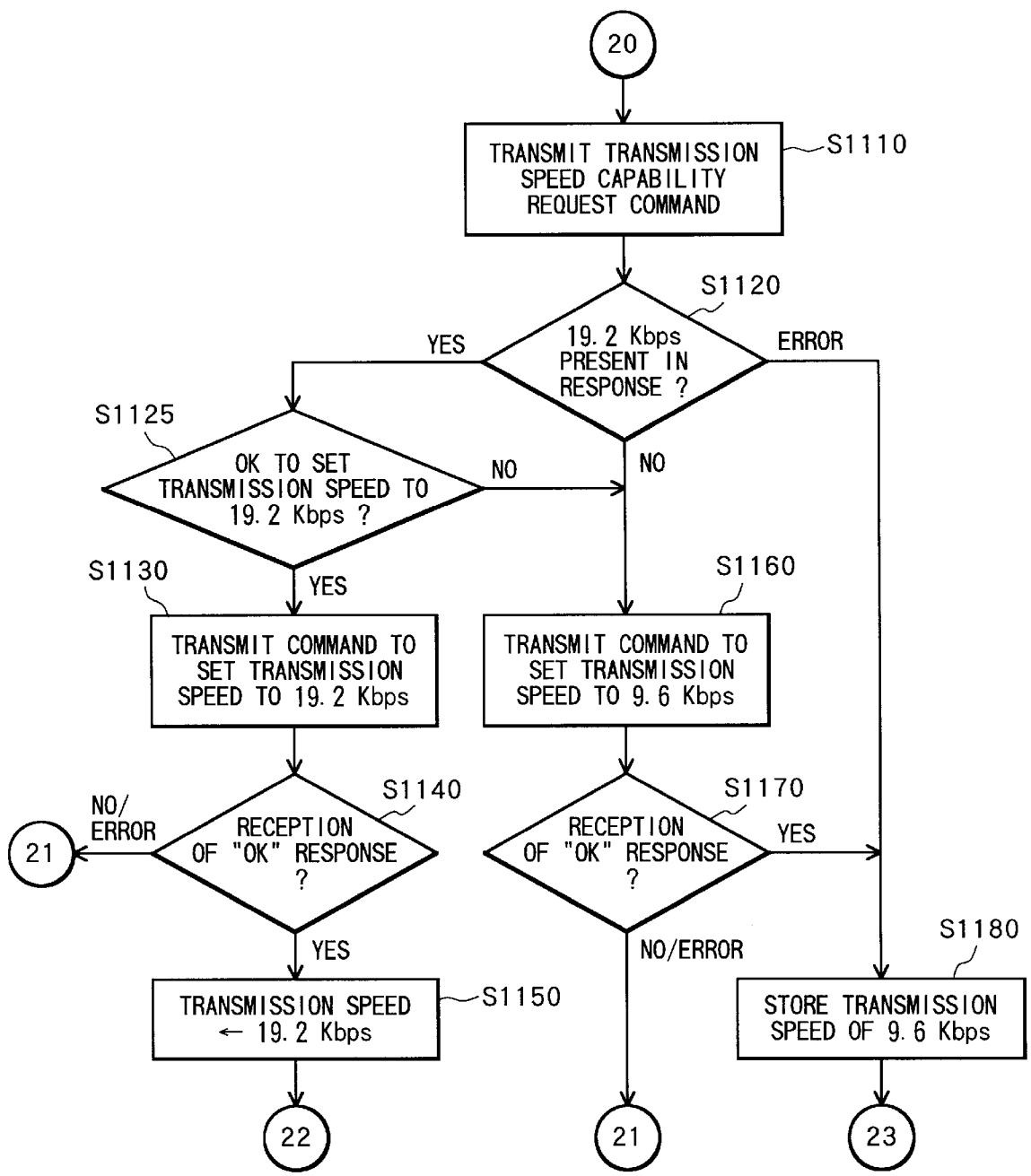
FIG. 16 is a flowchart representing a portion of a transmission speed setting routine according to a second embodiment of the present invention.
Figure 17:
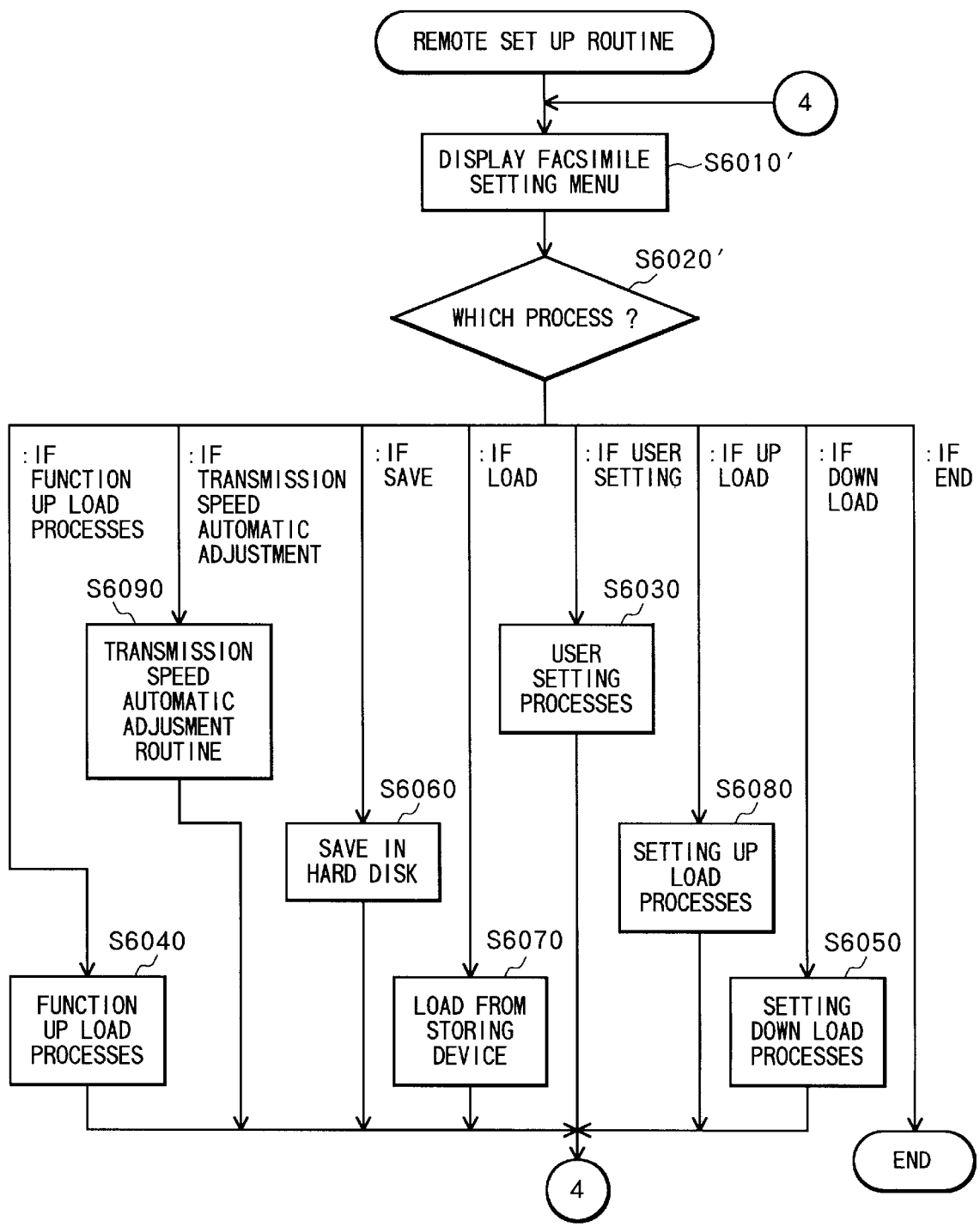
FIG. 17 is a flowchart representing a remote set up routine according to the second embodiment.

As shown in FIG. 16, in the second embodiment, a determination step S1125 is performed as a result of a positive determination in S1120. In S1125, a question is displayed on the LCD 108 asking the user whether or not the transmission speed should be set to 19.2 Kbps, which is the highest transmission speed common to both the personal computer 98 and the facsimile machine 2.

The operator hen determines based on his or her experience with the personal computer 98 whether or not there is a danger that data will be lost by transmitting at a speed of 19.2 Kbps. For example, the operator can select "DO NOT SET" by inputting a command indicating a data loss condition exists because he or she observes that data has been erroneously transmitted from the remote device to the transmission device. If the operator inputs such as command, then S1125 will result in a negative determination so that a slower transmission speed should be set.

In this way, the operator can set the transmission speed to a lower transmission speed than the highest transmission speed when he or she judges there is a danger that transmission data might be lost or is presently being lost because of the burden being placed on the transmission device or because of an error condition such as a reception error. As a result, the transmission speed will not place too great a burden on the computer 98 so that loss of transmitted data can be prevented.

On the other hand, if the operator decides that there is no danger of data being lost by transmitting at the transmission speed of 19.2 Kbps, then he or she selects "SET." When the operator selects "SET," then the operator gives permission to set the transmission speed to 19.2 Kbps (S1125:YES), so that as described in the first embodiment, in S1130 a command to set the transmission speed to 19.2 Kbps is transmitted to the facsimile machine 2. Then in S1140, it is determined whether or not an "OK" response was received as described in the first embodiment.

In regards to this command, the S2150 of the processes shown in FIG. 8 for the printer portion 74 of the facsimile machine 2 will result in a positive determination. Therefore, the transmission speed of the personal computer interface 96 is set to 19.2 Kbps. After the transmission speed is set, the printer portion 74 transmits an "OK" signal to the personal computer 98 in S2160.

Since an "OK" response was received, S1140 in the personal computer 98 will result in a positive determination, whereupon the personal computer 98 sets its own transmission speed to 19.2 Kbps in S1150. For confirmation purposes, the personal computer 98 transmits in S1080 of FIG. 5 a command to again set the transmission speed of the facsimile machine to 19.2 Kbps and determines in S1090 whether or not an "OK" response has been received.

In regards to the command transmitted in S1080, the printer portion 74 of the facsimile machine 2 makes a positive determination in S2150 of FIG. 8 and so again sets the transmission speed of the interface 96 to 19.2 Kbps and transmits an "OK" signal to the personal computer 98 in S2160.

Figure 5:
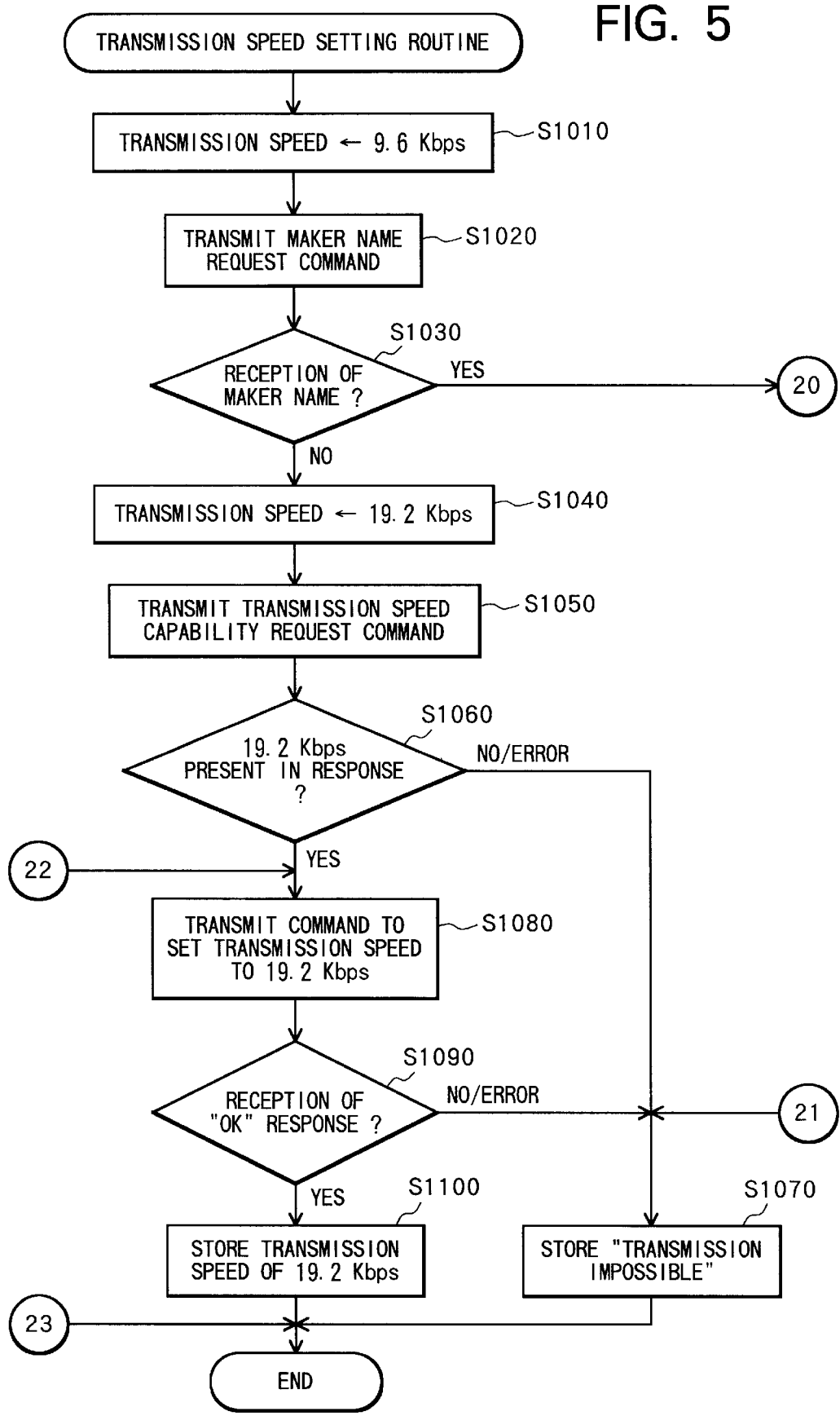
FIG. 5 is a flowchart representing processes performed in the computer for setting transmission speed.

Since the personal computer 98 received an "OK" response, then its S1090 of FIG. 5 will result in a positive determination, whereupon the data of 19.2 Kbps transmission speed is stored in the hard disk 112, the RAM 106, and the like in S1100. Therefore, even though it is initially determined that the personal computer 98 and facsimile machine 2 are capable of transmitting at 9.6 Kbps, as a result of the processes in S1125 and on, the transmission speed is set to the high speed of 19.2 Kbps because it is determined that the highest common transmission speed is 19.2 Kbps.

It should be noted that either when S1120 of FIG. 16 results in a negative determination because the response from the printer portion 74 does not indicate a transmission speed capability of 19.2 Kbps, that is, because the interface 96 of the printer portion 74 is only capable of the transmission speed of 9.6 Kbps, or when S1125 results in a negative determination because the operator indicated not to set the transmission speed to the highest transmission speed of 19.2 Kbps, then the computer 98 transmits in S1160 a command for setting transmission speed to 9.6 Kbps to the facsimile machine 2 and then determines in S1170 whether or not an "OK" response has been received.

Figure 18:
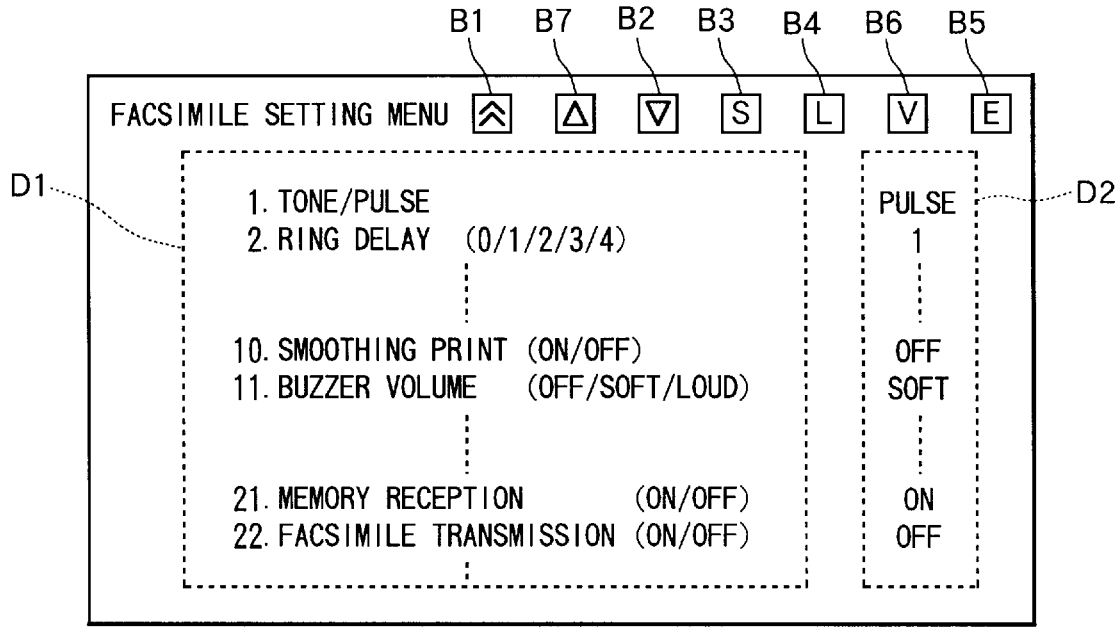
FIG. 18(a) and 18(b) are schematic views of facsimile setting menus displayed on a display of the facsimile machine according to the second embodiment.
Figure 18:
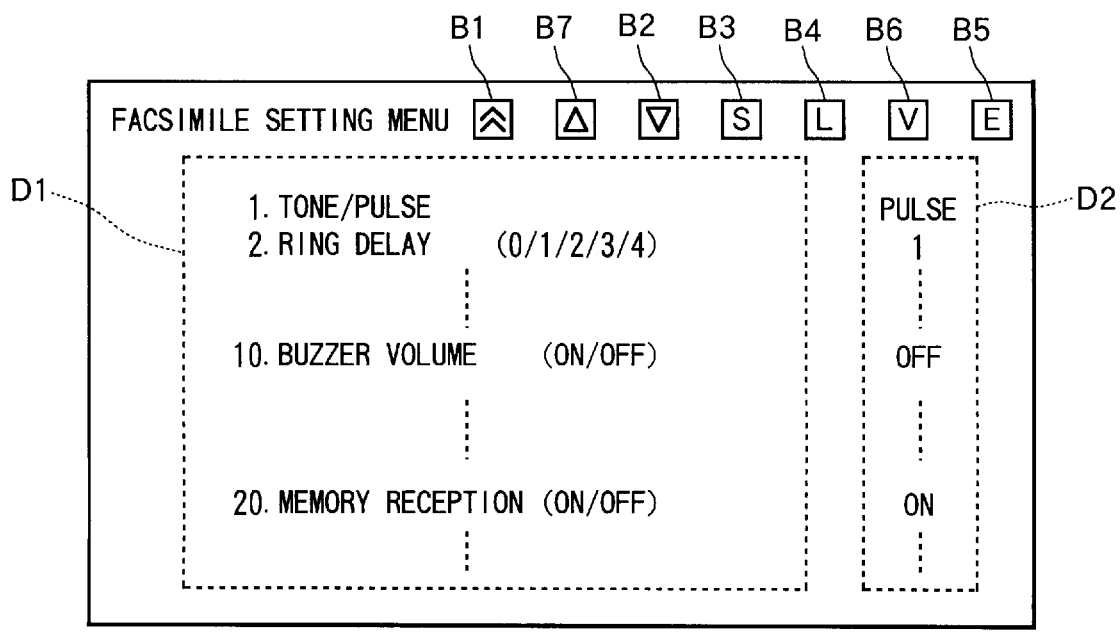

As mentioned above, the remote set up processes of the first embodiment are slightly modified in the second embodiment as shown in FIG. 17. In a S6020' of the second embodiment a facsimile setting menu is displayed on the LCD 108. As shown in FIGS. 18a and 18b, the facsimile setting menu includes a further key B6.

Next, the same selections can be made in S6020' as described for S6020 in FIG. 14. Additionally, an operator can activate a transmission speed automatic adjustment routine in S6090 by selecting the button B6 on the screen using the mouse.

Although the transmission speed automatic adjustment routine is the same as the transmission speed setting routine of S1000 shown in FIGS. 5 and 6, the transmission speed automatic adjustment routine is provided for the following reasons. In the processes of S6040, the facsimile machine 2 stores, in the RAM 106, the hard disk 112, and the like, function data transmitted in response to a function data transmission request command. However, when data stored in S6040 is displayed in S6010, sometimes erroneous characters are displayed or sometimes characters are missing. This is probably because the computer 98 loses data during reception from the facsimile machine 2 because the computer 98 can not process incoming data quickly enough at the present transmission speed and also perform other processes. An operator that realizes this can set the transmission speed to a lower transmission speed in S1125 of FIG. 6.

Further, when the facsimile machine 2 is replaced with a new facsimile machine, then the operator can again perform the processes of S6090 to automatically adjust the transmission speed. Of course at this time also, in the processes of S1125 the operator can set either the highest transmission speed of 19.2 Kbps or the slower transmission speed of 9.6 Kbps depending on the reception condition of the computer 98.

Further, by inputting "DO NOT SET 19.2 KBPS TRANSMISSION SPEED" in S1125, the operator can set transmission speed between the computer 98 and the facsimile machine 2 to a transmission speed of 9.6 Kbps, which is slower than the highest transmission speed of 19.2 Kbps acquired during transmission between the computer 98 and the facsimile machine 2. Accordingly, even if processes in S1000 for automatically setting the transmission speed and processes in S6090 for automatically adjusting the transmission speed are performed, data can be transmitted without losing data because the operator commanded that transmission be performed at a slower speed.

Figure 19:
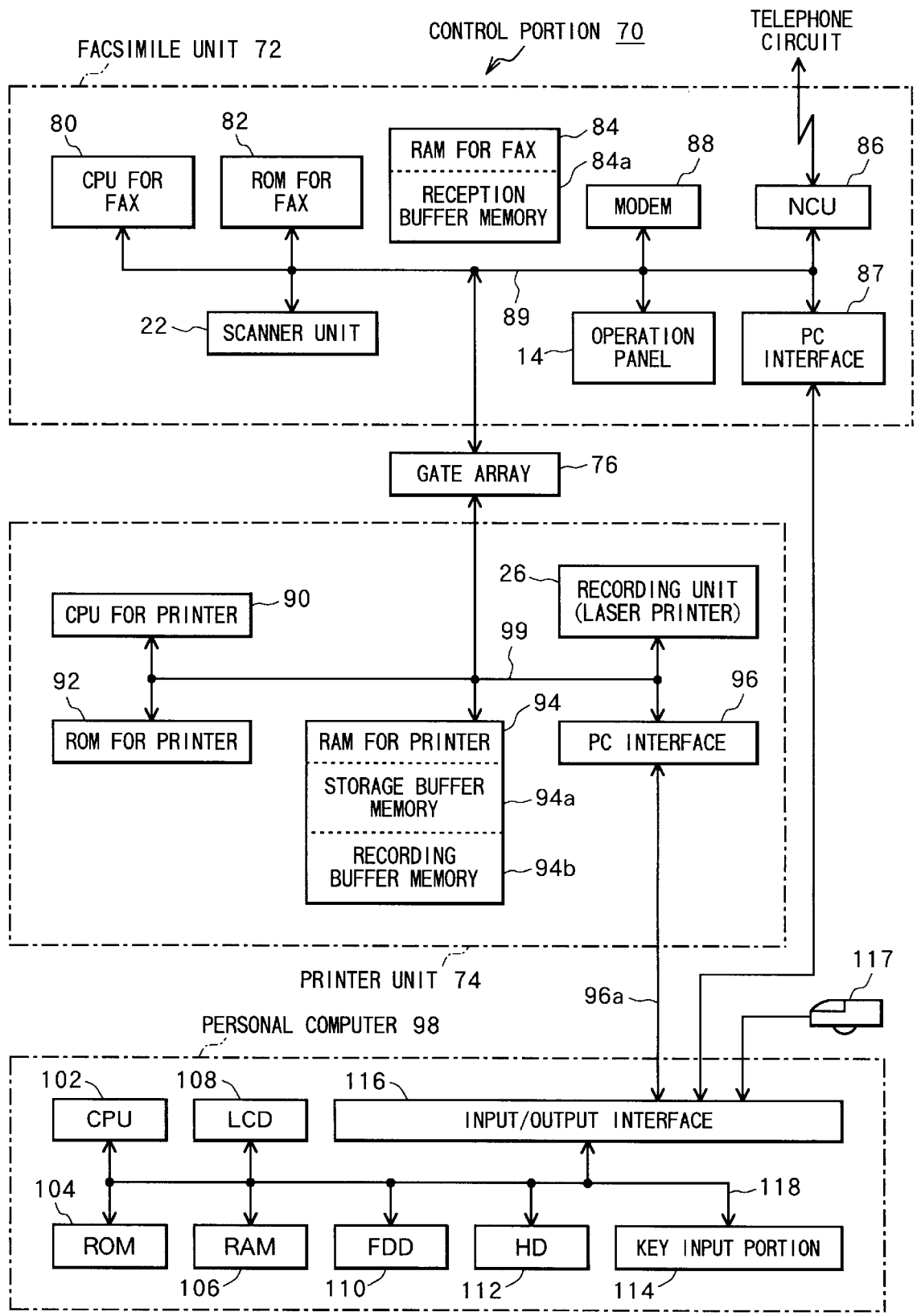
FIG. 19 is a block diagram showing internal configuration and interconnection of a facsimile machine and a computer according to a third embodiment of the present invention.

Transmission and reception of commands or data between the computer 98 and the facsimile unit 72 are performed in the first and second embodiment via the printer unit 71. However, according to a third embodiment of the present invention, the facsimile unit 72 is provided with a PC interface 87 such as an RS232C interface as shown in FIG. 19. Therefore in the third embodiment, direct transmission between the facsimile unit 72 and the computer 98 is possible. That is, the computer 98 can transmit maker name request commands, function data transmission request commands, and function setting data directly to the facsimile unit 72 via the PC interface 87. Also, the facsimile unit 72 can transmit data for maker name, function data, and the like directly to the computer 98. In addition to achieving the same beneficial effects as the first embodiment, this reduces the load of processes in the printer unit 74.

In this case, the transmission speed of the PC interface 87 must also be set. The transmission speed of the PC interface 87 can be automatically set by the same processes as described in the first and second embodiments. Of course, the transmission speed of the PC interface 96 for connection to the computer 98 can also be automatically set using the above-described processes.

While the invention has been described in detail with reference to specific embodiments thereof, it would be apparent to those skilled in the art that various changes and modifications may be made therein without departing from the spirit of the invention, the scope of which is defined by the attached claims.

Although the first through third embodiments described the present embodiment applied to a facsimile machine 2 with a printer function, this is only one example. The present invention can also be applied to a facsimile machine which functions only as a facsimile machine. In this case, the facsimile machine would be provided with the same interface as the PC interface 87 and would not function as a printer for printing PC data. Of course, automatic setting of the transmission speed is performed in regards to the PC interface 87.

Although in the first through third embodiments the transmission speed setting processes of S1000 are performed during start-up processes, they can be performed before start-up processes. Setting of transmission speed can be performed by executing the transmission speed setting process of S1000 directly after the power source of the computer 98 is turned on and the operation system has started up. That is, the transmission speed for transmission between the facsimile machine 2 and the computer 98 can be set before execution of facsimile processes and the like shown in FIG. 12.

In the second embodiment, the processes of S1125 for determining whether or not the high transmission speed of 19.2 Kbps should be set are performed after a positive determination in S1120. However, the processes of S1125 could alternatively be performed immediately after S1060 or between S1090 and S1100. These process orders are desirable because they give an operator an opportunity to judge whether data has been lost from the transmission speed capability data or the "OK" response data received at the highest speed of 19.3 Kbps.

In the embodiments, the computer 98 was provided with only two transmission speeds. However, when a computer has more transmission speeds, the highest common transmission speed can be determined by adding further determination steps for the other transmission speeds after negative determinations in S1060 and S1120.

Also, in the second embodiment, only two transmission speeds are common to both the computer 98 and to the facsimile machine 2. However, three or more transmission speeds can be common. When three or more transmission speeds are common, two or more common transmission speeds will be lower than the highest common transmission speed. Therefore, in S1125 any transmission speed can be selected as long as it is slower than the highest. Also, the program can be designed to that the operator can optionally select one of the two or three slower transmission speeds.

What is claimed is:

1. A data transmission speed setting device for setting speed at which data is transmitted between an inquiring transmission device and a responding remote device over a digital transmission line, the data transmission speed setting device comprising:

communicable condition establishing means of the transmission device for establishing a communicable condition between the transmission device and the remote device while sequentially changing a transmission speed of the transmission device;

inquiry command transmission means of the transmission device for transmitting an inquiry command to the remote device at a transmission speed used when the communicable condition is first established between the transmission device and the remote device;

transmission speed capability acquisition means of the transmission device for receiving, from the remote device, a response to the inquiry command and for determining based on the content of the response any transmission speeds common between the remote device and the transmission device; and transmission speed setting means of the transmission device for setting transmission speed at which transmission between the transmission device and the remote device is to be performed to one of the transmission speeds common between the remote device and the transmission device.

2. A data transmission speed setting device as claimed in claim 1 wherein the transmission speed setting means sets the transmission speed to a highest transmission speed common between the remote device and the transmission device.

3. A data transmission speed setting device as claimed in claim 1 wherein the transmission speed setting means sets the transmission speed to a transmission speed lower than a highest transmission speed common between the remote device and the transmission device.

4. A data transmission speed setting device as claimed in claim 3 wherein the transmission speed setting means sets the transmission speed to a transmission speed that is second highest of the transmission speeds common between the remote device and the transmission device.

5. A data transmission speed setting device as claimed in claim 3 further comprising input means for inputting commands to the transmission speed setting means, the transmission speed setting means setting the transmission speed to the lower transmission speed based on a command inputted from the input means.

6. A data transmission speed setting device as claimed in claim 5 wherein the command inputted from the input means indicates an error condition.

7. A data transmission speed setting device as claimed in claim 5 wherein the command inputted from the input means indicates a data loss condition.

8. A data transmission speed setting device as claimed in claim 1 wherein the data transmission speed setting device sets transmission speed for transmission between a personal computer and a facsimile machine with a printer function.

9. A data transmission speed setting device as claimed in claim 1 further comprising:

transmission speed changing means for, when the transmission speed capability acquisition means does not receive from the remote device a response to the inquiry command, changing the predetermined transmission speed at which the inquiry command transmission means transmits; and wherein the inquiry command transmission means transmits another inquiry command to the remote device at the changed predetermined transmission speed; and the transmission speed setting means sets the transmission speed based on a response from the remote device received by the transmission speed capability acquisition means with regards the another inquiry command.

10. A data transmission speed setting device as claimed in claim 1 wherein the inquiry command transmission means further transmits to the remote device a maker name request command before transmitting the inquiry command.

11. A data transmission speed setting device for setting speed at which data is transmitted between an inquiring transmission device and a responding remote device over a digital transmission line, the data transmission speed setting device comprising:

inquiry command transmission means of the transmission device for transmitting an inquiry command to the remote device at a predetermined bits per second transmission speed;

transmission speed capability acquisition means of the transmission device for receiving, from the remote device, a response to the inquiry command; and transmission speed setting means of the transmission device for setting transmission speed at which transmission between the transmission device and a remote device is to be performed to the predetermined bits per second transmission speed of the inquiry command transmission means.

12. A data transmission speed setting device as claimed in claim 11 further comprising:

transmission speed changing means for, when the transmission speed capability acquisition means does not receive from the remote device a response to the inquiry command, changing the predetermined transmission speed at which the inquiry command transmission means transmits; and wherein the inquiry command transmission means transmits another inquiry command to the remote device at the changed predetermined transmission speed;

the transmission speed capability acquisition means receives a response to the another inquiry command and determines based on the content of the response any transmission speeds common between the remote device and the transmission device; and the transmission speed setting means sets the transmission speed based on the response from the remote device received by the transmission speed capability acquisition means in regards to the another inquiry command.

13. A data transmission speed setting device as claimed in claim 12 wherein the transmission speed setting means sets the transmission speed to a highest transmission speed common between the remote device and the transmission device.

14. A data transmission speed setting device as claimed in claim 12 wherein the transmission speed setting means sets the transmission speed to a transmission speed lower than a highest transmission speed common between the remote device and the transmission device.

15. A data transmission speed setting device as claimed in claim 11 wherein the data transmission speed setting device sets transmission speed for transmission between a personal computer and a facsimile machine with a printer function.

16. A data transmission speed setting device as claimed in claim 11 wherein the inquiry command is a maker name request command.

17. A method for setting speed at which data is transmitted between an inquiring transmission device and a responding remote device over a digital transmission line, the method comprising the steps of:

establishing a communicable condition between the transmission device and the remote device while sequentially changing a transmission speed of the inquiring transmission device;

transmitting an inquiry command from the transmission device to the remote device at a transmission speed used when the communicable condition is first established between the transmission device and the remote device;

receiving, from the remote device, a response to the inquiry command;

determining based on the content of the response any transmission speeds common between the remote device and the transmission device; and setting transmission speed of the transmission device at which transmission between the transmission device and the remote device is to be performed to one of the transmission speeds common between the remote device and the transmission device.

18. A method as claimed in claim 17 wherein the transmission speed is set, in the step of setting transmission speed, to a highest transmission speed common between the remote device and the transmission device.

19. A method as claimed in claim 17 wherein the transmission speed is set, in the step of setting transmission speed, to a transmission speed lower than a highest transmission speed common between the remote device and the transmission device.

20. A method as claimed in claim 17 wherein the method is for setting transmission speed for transmission between a personal computer and a facsimile machine with a printer function.

21. A method as claimed in claim 17 further comprising the steps of:

changing the predetermined transmission speed when no response to the inquiry command is received from the remote device;

transmitting another inquiry command to the remote device at the changed predetermined transmission speed; and setting the transmission speed based on a response from the remote device received with regards the another inquiry command.

22. A method for setting speed at which data is transmitted between an inquiring transmission device and a responding remote device over a digital transmission line, the method comprising the steps of:

transmitting an inquiry command from the transmission device to the remote device at a predetermined bits per second transmission speed;

receiving, from the remote device, a response to the inquiry command; and setting transmission speed of the transmission device at which transmission between the transmission device and a remote device is to be performed to the predetermined bits per second transmission speed.

23. A method as claimed in claim 22 further comprising the steps of:

changing the predetermined speed when no response is received to the inquiry command;

transmitting another inquiry command to the remote device at the changed predetermined transmission speed;

receiving a response to the another inquiry command;

determining based on the content of the response any transmission speeds common between the remote device and the transmission device; and setting the transmission speed to a transmission speed common to the remote device and the transmission device.

24. A method as claimed in claim 22 wherein the method is for setting transmission speed for transmission between a personal computer and a facsimile machine with a printer function.

25. A method as claimed in claim 22 wherein the inquiry command is a maker name request command.

* * * * *